(12) United States Patent
Stott et al.

(10) Patent No.: US 9,369,369 B2
(45) Date of Patent: Jun. 14, 2016

(54) SYSTEMS AND METHODS FOR USING PROTOCOL INFORMATION TO TRIGGER WAVEFORM ANALYSIS

(71) Applicant: Ixia, Calabasas, CA (US)

(72) Inventors: Lester Noel Stott, Aloha, OR (US); David Jennings Wicker, Jr., Hillsboro, OR (US); Jeffrey Dean Marker, Sherwood, OR (US); Alexander David Rekow, Portland, OR (US); Timothy Earl Bennington-Davis, Tualatin, OR (US); Thomas Alexander, Mulino, OR (US)

(73) Assignee: IXIA, Calabasas, CA (US)

( * ) Notice: Subject to any disclaimer, the term of this patent is extended or adjusted under 35 U.S.C. 154(b) by 0 days.

(21) Appl. No.: 13/785,878

(22) Filed: Mar. 5, 2013

(65) Prior Publication Data

US 2014/0254647 A1    Sep. 11, 2014

(51) Int. Cl.
*H04B 3/46*     (2015.01)
*H04B 17/00*    (2015.01)
*H04Q 1/20*     (2006.01)
(Continued)

(52) U.S. Cl.
CPC .............. *H04L 43/50* (2013.01); *H04L 41/24* (2013.01); *H04L 43/12* (2013.01); *H04L 1/206* (2013.01); *H04L 43/08* (2013.01)

(58) Field of Classification Search
CPC ..... G06F 17/5022; G06F 13/22; G06F 11/25; H04L 12/2697; H01R 31/319; G01R 31/3177
USPC .............. 375/224, 228; 324/750.15; 714/715, 714/712; 455/423, 425
See application file for complete search history.

(56) References Cited

U.S. PATENT DOCUMENTS 7,047,042 B2    5/2006  Komara et al.
7,333,964 B2 *  2/2008  Dippon .......................... 706/20
(Continued)

FOREIGN PATENT DOCUMENTS

WO    WO-2013/089874 A1    6/2013

OTHER PUBLICATIONS

"PCI Express® Protocol Triggering and Decode for Infiniium 9000 Series Oscilloscopes," Data Sheet, Agilent Technologies, pp. 1-8 (Jun. 2014).

(Continued)

*Primary Examiner* — Shuwang Liu
*Assistant Examiner* — Sung Ahn
(74) *Attorney, Agent, or Firm* — Jenkins, Wilson, Taylor & Hunt, P.A.

(57) ABSTRACT

Systems and methods are disclosed herein to provide communication test systems for the testing of packet data communication devices, systems and networks. According to one aspect of the subject matter described herein, a test system containing an integrated traffic, protocol and waveform analyzer is disclosed that includes a traffic generator/analyzer and a protocol engine that triggers a waveform analyzer to analyze the signal waveform of a device under test at a predetermined point. Such a test system may offer improved capabilities such as a more selective and accurate measurement of complex signal waveforms, more automated measurements of waveforms pertaining to wireless communication data streams, and more rapid identification and measurement of waveforms corresponding to errored packets.

47 Claims, 17 Drawing Sheets

(51) Int. Cl.
*H04L 12/26* (2006.01)
*H04L 12/24* (2006.01)
*H04L 1/20* (2006.01)

(56) References Cited

U.S. PATENT DOCUMENTS

| | | | | |
|---|---|---|---|---|
| 7,539,489 | B1* | 5/2009 | Alexander | H04W 24/06 370/241 |
| 7,672,669 | B2* | 3/2010 | Alexander | H04W 24/06 455/423 |
| 7,890,821 | B2* | 2/2011 | Music et al. | 714/715 |
| 8,600,311 | B2 | 12/2013 | Gregg et al. | |
| 2003/0108044 | A1* | 6/2003 | Hendel | 370/392 |
| 2006/0262763 | A1* | 11/2006 | Peleg et al. | 370/338 |
| 2008/0298380 | A1* | 12/2008 | Rittmeyer | H04L 12/2697 370/412 |
| 2009/0094492 | A1* | 4/2009 | Music | G06F 11/261 714/715 |
| 2011/0103235 | A1* | 5/2011 | Luong et al. | 370/245 |
| 2012/0051224 | A1* | 3/2012 | Olgaard et al. | 370/241 |
| 2013/0049786 | A1 | 2/2013 | El-Hassan et al. | |
| 2013/0326274 | A1* | 12/2013 | Olgaard | G06F 11/2733 714/32 |
| 2014/0133321 | A1 | 5/2014 | Luong et al. | |

OTHER PUBLICATIONS

"WLAN 802.11a/b/g/n/ac X-Series Measurement Application N9077A & W9077A," Technical Overview, Agilent Technologies, pp. 1-19 (Jun. 2014).
"WaveTest Multi-client Traffic Generator/Performance Analyzer," Ixia Data Sheet, Document No. 915-6019-01 Rev D, pp. 1-9 (Apr. 2014).
"WaveBlade Wi-Fi 802.11 a/b/g/n," Ixia Data Sheet, Document No. 915-6016-01 Rev C, pp. 1-6 (Jan. 2014).
"Testing WLAN Devices According to IEEE 802.11 Standards," Application Note, Agilent Technologies, pp. 1-15 (Oct. 2013).
"Creating and Optimizing 802.11ac Signals and Measurements," Application Note, Agilent Technologies, pp. 1-24 (Jul. 2012).
Bardwell, Joseph, "Wireless Network Site Verification and Analysis Tools," Connect802 Corporation, pp. 1-18 (2008).
Dreimann, Michael, "LTE protocol tests for IO(D)T and R&D using the R&S® CMW 500," Wireless Technologies Testers, pp. 16-20 (Publication Date Unknown).
"WLAN Monitoring Made Easy," CommView® for WiFi, Wireless Network Monitor and Analyzer, TAMOSOFT, pp. 1-3 (Publication Date Unknown).
Burke, Ronald, "Using Protocol Aware Tools to Simplify Program Development for RF SOC Test," High Frequency Electronics, vol. 10, No. 12, pp. 32, 34, & 36 (Dec. 2011).

* cited by examiner

SYSTEMS AND METHODS FOR USING PROTOCOL INFORMATION TO TRIGGER WAVEFORM ANALYSIS

TECHNICAL FIELD

The subject matter described herein relates generally to the test and measurement of data communication systems; and more particularly to systems and methods for analyzing waveforms generated by data communication systems, including but not limited to wireless data communication systems.

BACKGROUND

Data communications devices, systems and networks have gained widespread use worldwide. However, they have also become more sophisticated and complex even as they become ubiquitous and crucial to the activities of enterprises and users. Further, they employ ever more complex signal waveforms in order to communicate at higher data rates and support an increased number of users and data traffic. Manufacturers, vendors and users therefore have a greater need for testing such systems.

Unfortunately, the increasing complexity of such data communication devices and systems makes them harder to test. The recent advent of wireless data communication systems has further multiplied this difficulty, as wireless devices employ both radio-frequency (RF) signals utilizing highly complex digital modulation methods such as Orthogonal Frequency Division Multiplexing (OFDM) as well as Multiple-Input Multiple-Output (MIMO) coding, in conjunction with packetized connection-oriented stateful protocols over a shared radio frequency (RF) medium. Such devices further need to support Quality of Service (QoS) sensitive applications such as voice and video, and implement advanced coding and error correction algorithms to overcome the effects of channel noise and distortion.

The requirements placed upon such wireless devices wakes them highly prone to failures due to unwanted signal errors or distortion. Therefore it is very attractive to manufacturers and users to test these devices to detect the occurrences of signal errors and distortion, to capture the signals corresponding to these errors and measure the amount of signal error and distortion, and to conduct these tests in an automated fashion. Unfortunately the complexity of the physical layer (PHY) and link layer (Medium Access Control or MAC) layer protocols makes it very difficult to identify the exact location of a signal error or distortion, as the occurrence of an error may not be detected until the entire processing has been performed and the protocol functions have been executed. Further, the extremely high signal bandwidths and consequently high data rates of such devices renders the storage of sufficient raw signal data to perform post-processing measurements very expensive and time-consuming, necessitating real-time (on-line) signal error and distortion measurements. Finally, the interactions between PRY and MAC layer protocols render the signals generated by these wireless devices unpredictable, thereby making it difficult or impossible to create automated tests for these errors.

Existing systems for testing complex wireless data communication devices fall into two broad categories: wireless traffic and protocol test systems, and wireless signal generation and analysis systems.

With reference to FIG. 1, an exemplary wireless traffic and protocol test system is represented, consisting of a Device Under Test (DUT) 100 interfaced to wireless traffic and protocol analyzer 101 by means of radio interface 103 and interfaced to wired traffic and protocol analyzer 102 by means of Ethernet interface 104. Wireless and wired analyzers 101 and 102 respectively are coordinated to send and receive test traffic by test configuration and management system 105. A set of traffic test requirements 106 may typically be drawn up describing a plurality of test cases. Analyzers 101 and 102 respectively are capable of following and comprehending communication protocols utilized by DUT 100 while performing tests, thereby making highly deterministic measurements at the packet level and above. It is possible to provide traffic test requirements 106 in computer-readable form as program data directly to test configuration and management system 105, which then performs the necessary test cases automatically without need for human intervention. However, tests performed by such an exemplary test system are limited to the packet level, protocol level, and traffic level, as such a system has no capability to define, interpret and make measurements on the actual radio or analog signals emitted by DUT 100.

FIG. 2 is an exemplary illustration of a conventional wireless traffic and protocol analyzer 101. Packetized test data traffic flows generated by test traffic generator 110 are passed to packet transmission datapath 111, which encapsulates and encodes them into a framed digital data stream suitable for baseband conversion and transmission. In an exemplary case of an IEEE 802.11 system, this digital data stream would represent PHY Layer Convergence Protocol (PLCP) frames; alternatively, in another exemplary case of Fourth Generation Long Term Evolution (4G LTE) cellular systems, this digital data stream would represent the Transport Channel (TC) data frames prior to PHY coding and rate matching. The digital data stream is then passed to transmit digital PHY logic 112 which performs the transmit digital baseband functions of coding, modulation and signal processing, and finally to transmit Digital to Analog (D/A) function 113 which converts signals from the coded digital domain to the analog domain for transmission to DUT 100. It should be understood that transmit D/A function 113 may encompass standard frequency upconversion and mixing functions if any are required.

In the receive direction, DUT 100 sends analog signals to receive Analog to Digital (A/D) function 114, which converts signals from the analog domain to the coded digital domain. It should be understood that receive A/D function 114 may encompass standard amplification, mixing, downconversion and filtering functions if any are required. The coded digital signals are passed to receive digital PHY logic 115, which performs receive digital baseband functions of signal processing, demodulation, decoding and error correction to obtain a framed digital data stream containing packets. This is in turn passed to packet reception datapath 116, which extracts and processes packets from the framed digital data stream. These extracted packets are sent to test traffic analyzer 117 to analyze the traffic generated by the DUT at the MAC layer and above.

In many cases, as in the exemplary situations of IEEE 802.11 and 4G LTE, DUT 100 may not transmit or receive test traffic unless the appropriate protocol interactions have been completed. Further, random errors and delays may cause the exact sequence of packets transmitted to and received from DUT 100 to be unpredictable; therefore, it may be necessary to implement the full ISO/OSI Layers 2 through 7 protocol functions in order to identify the correct sequences of test traffic to analyze. Finally, the exemplary wireless protocols may multiplex packet traffic flows for many different flows and end-users together into a single wireless channel, and it may only be possible to determine test traffic belonging to a specific flow or end-user by following the correct protocol. Protocol engine 118 implements the packet layer protocol functions required by the wireless communication protocol implemented by DUT 100, using the capabilities of packet transmission datapath 111 and packet reception datapath 116 to exchange packets with DUT 100. Packet flow table 119 contains traffic flow definitions and identifying fields that are used by protocol engine 118 as well as test traffic generator 110 and test traffic analyzer 117.

Turning now to FIG. 3, an exemplary conventional wireless signal analysis system is depicted, which may comprise DUT 100 including radio interface 103 and Ethernet interface 104, and connected to wireless signal analyzer 130. To cause DUT 100 to emit signals that may be analyzed by wireless signal analyzer 130, wired traffic generator 131 may be used to inject packet traffic into Ethernet interface 104 of DUT 100; these packets may then be forwarded out radio interface 103, whereupon the signals generated by DUT 100 can be analyzed in the time and frequency (spectral) domain. Typical analysis functions that may be performed on these signals include power spectral density (PSD), spectral mask compliance, error vector magnitude (EVM), and total radiated power (TRP), all of which are well known and need not be further described herein. The specific analysis functions to be performed may be set forth in signal test requirements 132. However, unlike the situation with the exemplary wireless traffic and protocol test system depicted in FIG. 1, it has heretofore proved impossible except in very specific cases to perform such analysis functions automatically on an unmodified DUT 100. Therefore, operator 133 may be required to translate signal test requirements 132 into the actual configurations of wireless signal analyzer 130 and wired traffic generator 131, and further may be required to conduct the necessary tests by manually activating wired traffic generator 131, triggering wireless signal analyzer 130, and repeating the procedure until a suitable waveform has been captured and analyzed.

An exemplary conventional wireless signal analyzer 130 is presented in FIG. 4. It may typically comprise: receive A/D function 138 that translates analog signals generated by the radio interface of DUT 100 to the digital domain; receive waveform analyzer 137 that processes the digitized signals; receive waveform memory 136 that holds the raw data generated thereby; and waveform post-processing function 135 that reads stored data from receive waveform memory 136, identifies some location within the stream of waveform data according to some property of the waveform, performs the desired signal analysis function, and displays it on a screen or other output device for the edification of operator 133. It should be understood that receive A/D function 138 may encompass standard amplification, mixing, downconversion, and filtering functions if any are required. It should further be understood that many alternate implementations of wireless signal analyzer 130 may exist, but they all share the common characteristic that the analysis function is triggered by some signal property of the waveform itself, or by some external digital or analog trigger, without any correlation to a higher layer structure that may be embodied within the signal waveform. Wireless signal analyzers therefore make the assumption that the signal stream comprises a simple predefined series of framed packets whose structure and composition are known in advance.

In the exemplary cases of IEEE 802.11 and 4G LTE, as has already been noted, DUT 100 may not transmit or receive traffic without first completing the appropriate protocol interactions. These protocol interactions may further be complex and require significant amounts of packets to be exchanged with DUT 100. In this case, wireless signal analyzer 130 may not be able to perform any analysis functions at all, because DUT 100 will not transmit any analyzable signals. Therefore, it may be necessary to utilize a wireless traffic and protocol analyzer function 101 in conjunction with wireless signal analyzer 130, as exemplified by FIG. 5. Wireless traffic and protocol analyzer 101 may interact with DUT 100 and cause the latter to send and receive packetized signals; a portion of the signals transmitted by DUT 100 is drawn off by signal tap 140 and fed to wireless signal analyzer 130, which may then proceed to perform analysis functions on these signals.

All of these exemplary instances of conventional signal analyzers and protocol analyzers suffer from the significant deficiency that they are unable to cope with the complex nature of the signals involved in modern wireless communication systems such as IEEE 802.11 and 4G LTE. Wireless communication protocols may support many clients or User Equipment (UEs) concurrently sharing a single radio channel, and may further employ contention between clients and DUT 100 to regulate access to this shared channel. Further, these wireless communication protocols may use random backoff and recovery schemes to mitigate and recover from the effects of collisions between stations, as well as error correcting codes, acknowledgements, retransmissions, windowing schemes and other complex mechanisms to handle signal errors on the wireless medium. Yet further, there may be complex interactions between various protocol layers, from the radio (PHY) to the application (Layer 7). This makes the traffic patterns actually observed on the radio channel quite unpredictable. Thus the signals emitted by wireless data communication devices may not be generally amenable to testing under the assumption of a simple, predefined sequences of packets, which is the assumption made by conventional wireless signal analyzer 130.

A further difficulty with conventional signal analysis systems is their need to capture very large volumes of raw data in order to successfully perform analysis. For instance, the exemplary system depicted in FIG. 3 may have to capture many seconds of digitized signal data in order to improve the probability of capturing at least one instance of a packet of interest. As presently known wireless data communications technologies may utilize bandwidths of many hundreds of megahertz, transferring gigabits of information per second, this causes the size of receive waveform memory 136 in exemplary wireless signal analyzer 130 to become extremely large. Also, the time required by waveform post-processing function 135 to process the data stored in receive waveform memory 136 is rendered very long, significantly impacting the usability of wireless signal analyzer 130 and reducing the rate at which tests may be performed on DUT 100.

Yet a further complexity is the presence of delay and bandwidth sensitive traffic such as voice and video in modern networks. A communications system carrying such traffic may need to reprioritize or reorder certain packets or sequences of packets in order to meet the Quality of Service (QoS) requirements of different types of traffic, and ensure that delay and bandwidth guarantees are met. The test systems for such devices and networks may therefore have to generate and analyze traffic conforming to different kinds of QoS requirements in a coordinated way, such that signal analysis results are identified with specific packets possessing predefined QoS parameters. Again, conventional test systems have difficulty in meeting such requirements.

Yet a further complexity is the need to test traffic flows associated with stateful, connection-oriented protocols. Examples of such protocols at Layer 4 of the ISO/OSI protocol hierarchy are IEEE 802.11 and 4G LTE. Another example at Layer 4 is the Transmission Control Protocol (TCP). Such stateful protocols can cause some traffic flows to stop and restart unpredictably, as the protocol state machines respond to such network events as mobility (roaming) and congestion, while other traffic flows continue unhindered. As a consequence, not only must the test systems for devices and networks implementing such stateful protocols be capable of generating and responding to such state transitions during the test, but the signal analysis on the signals generated by DUT 100 must be coordinated with the protocol functions so as to analyze the correct packets belonging to the desired traffic flows at the appropriate times. Conventional test systems have difficulty in meeting such requirements.

It should be appreciated that the above mentioned issues and requirements pertain to optical as well as wireless communications test systems. Heretofore, these issues and requirements have not received much attention in optical test systems because of the simple modulation functions used and their relative insensitivity to the characteristics of the data traffic being encoded. In addition, testing QoS functions for optical data traffic has hitherto not received much attention. However, with more complex modulation and coding schemes required to support higher data rates and the increasing need for QoS in data communication networks, it is important to account for these issues in optical test systems.

There is hence a need for improved data communication test systems and methods. A test system that can coordinate the analysis of the underlying signal waveform, with the wireless communication protocol, traffic flows, and data packets carried therein, may be desirable. Further, such a test system may preferably reduce the amount of waveform data captured during the analysis process, and may further preferably improve the efficiency of the test process and reduce the time required to conduct testing. Also, it may be desirable for such a test system to combine the protocol functions and signal analysis functions to simplify the task of causing a DUT to generate the desired signals for measurement. Finally, it may also be desirable for the test system to selectably analyze certain traffic flows with some predetermined characteristics that may preferably include properties such as QoS and TCP.

SUMMARY

Systems and methods are disclosed herein that may provide improved techniques for performing waveform analysis and testing of packet data communication devices, systems and networks. Such techniques may enable the improved capture of portions of signal waveforms that may correspond to packets or traffic flows of interest, or may allow wireless signal analysis to be coordinated with wireless protocol interactions. The systems and methods disclosed may further improve the efficiency of waveform data capture, and may also allow automated tests to be conducted with a reduction in the time required to perform these tests by potentially interacting with a DUT to generate required signals that are to be analyzed.

In accordance with one embodiment, a wireless traffic, protocol and signal analyzer is disclosed that may combine the waveform analysis function with the protocol and traffic functions. The analyzer may contain: transmit Digital-to-Analog (D/A) and receive Analog-to-Digital (A/D) functions, which may convert between digital communication signals and analog signals; transmit and receive digital Physical Layer (PHY) digital signal processing logic, which may preferably perform baseband digital signal processing functions; waveform analyzer logic for analysis of signal waveforms, which may be triggered by a plurality of events, and which may store information into a signal analysis memory; packet transmission and reception datapaths, operatively coupled to test traffic generation and analysis logic, which may preferably be operative to generate at least one stream of test data packets to the DUT, and may further be operative to process at least one stream of test data packets from the DUT; a protocol engine; a packet flow table that may describe a plurality of traffic flows or endpoints; and trigger logic that may be operatively coupled to the waveform analyzer logic and which may mark a plurality of events at which signal waveforms may be analyzed.

Preferably, the receive digital PHY signal processing logic may signify the presence of at least one condition detected within the received digital communication signal that may indicate data of interest for analysis.

The packet transmission and reception datapaths may preferably include processing for least the Layer 2 (MAC) level of the ISO/OSI protocol layer, and may further include protocol functions related to higher layers of the ISO/OSI protocol stack, including the IP and TCP layers. Preferably, the packet reception datapath may indicate the presence of at least one received packet denoting signal data of interest for analysis, and may further indicate the presence of at least one transmitted packet denoting signal data of interest for analysis.

In accordance with an aspect of the present embodiment, the protocol engine may implement a wireless communication protocol of interest, an exemplary protocol being IEEE 802.11. It may be operative to perform protocol handshakes with the DUT representing at least one test data packet stream being received from the DUT, and may be further operative to perform protocol handshakes representing at least one test data packet stream being transmitted to the DUT. Preferably, the protocol engine may denote at least one event within the wireless communication protocol that may denote the presence of signal data that may be of interest for analysis.

In accordance with another aspect of the present embodiment, the trigger logic may be operative to simultaneously receive inputs from a plurality of entities and may generate trigger signals based upon some combination of these inputs. Inputs to the trigger logic may be received from the receive digital PHY logic, the packet reception datapath, the packet transmission datapath, and the protocol engine. The trigger logic may further implement a storage for holding at least one set of trigger condition parameters, that may indicate at least one combination of inputs for which a trigger signal is generated.

Such a wireless traffic, protocol and signal analyzer may be operative to accept and process traffic flows according to a communication protocol of interest, and make signal measurements on the waveforms produced by a DUT which may be interfaced to the analyzer.

Advantageously, the waveform analysis function may capture and analyze a portion of the received signal that may range from a single data symbol to a set of data packets constituting a number of traffic flows. The waveform analysis function may further be operative to combine a plurality of data measurements to provide an aggregated measurement. An exemplary aggregated measurement is the average EVM of a set of packets belonging to the same traffic flow.

Advantageously, the trigger signal may be generated at a predetermined point within the receive signal, so as to capture and analyze a small portion of the received signal.

Advantageously, the trigger signal may be generated by a specific protocol handshake occurring within the communication protocol of interest, an exemplary protocol handshake being an IEEE 802.11 RTS/CTS exchange.

Advantageously, the trigger signal may be generated by the occurrence of packet that is more easily decoded than the packet upon which signal analysis is to be made, to allow the identification and analysis of waveforms under noisy conditions.

Advantageously, the trigger signal may be generated according to a higher-layer protocol property of a received packet, so as to perform measurements on specific packets of interest. Example packets of interest may include those with Frame Check Sequence (FCS) errors, or those for which TCP Duplicate Ack indications have been transmitted.

Advantageously, the waveform analysis function may be integrated within the receive digital PHY logic.

Advantageously, the waveform analysis function may be coordinated with a traffic generation function so that the DUT is caused to emit at least one packet of a predetermined type, enabling the automatic test of DUT signal waveforms for specific signal types.

In accordance with another embodiment, the waveform analysis function may perform analysis on a subset of the received signal frequencies and symbols, allowing analysis to be limited to a portion of the analog signal generated by the DUT. An example of such a portion may consist of those signal frequencies and symbols that correspond to a burst for at least one of a plurality of User Equipments (UEs) for a Fourth Generation Long Term Evolution (4G LTE) device.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The detailed description herein of the features and embodiments are best understood when taken in conjunction with the accompanying drawings, wherein.

It should be understood that like reference numerals are used to identify like elements illustrated in one or more of the above drawings.

DETAILED DESCRIPTION

Figure 1:
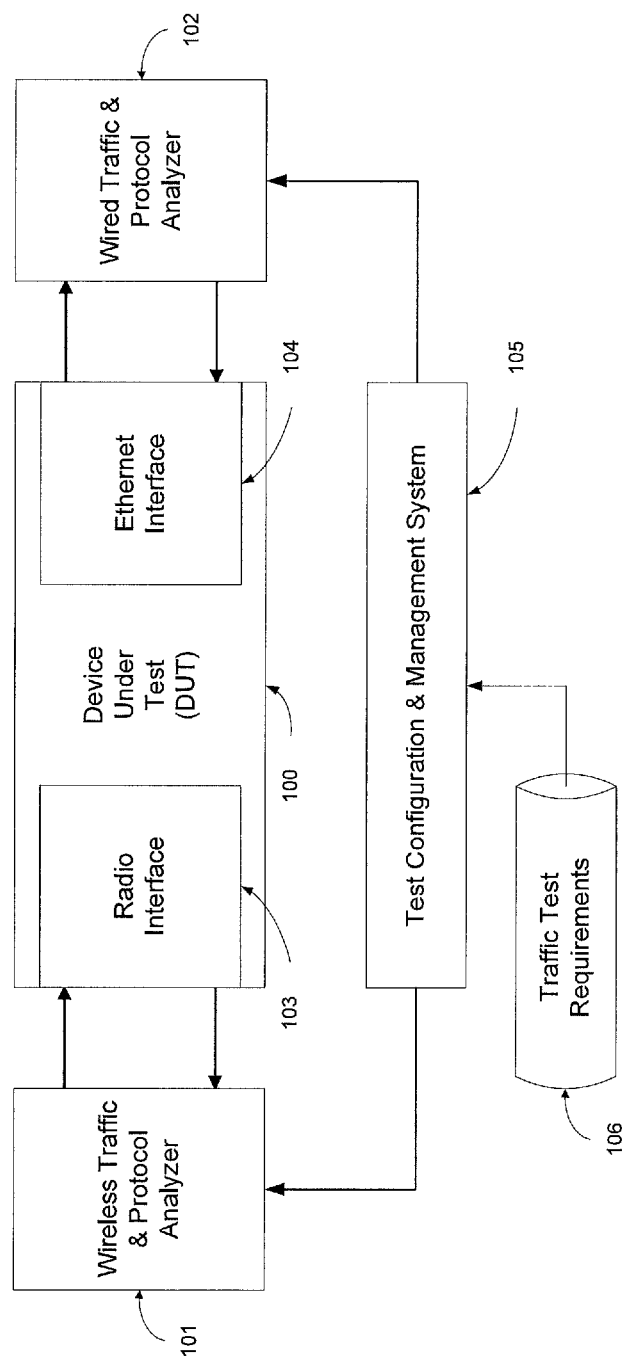
FIG. 1 shows a simplified representation of a conventional communications test setup for performing wireless traffic and protocol tests.
Figure 2:
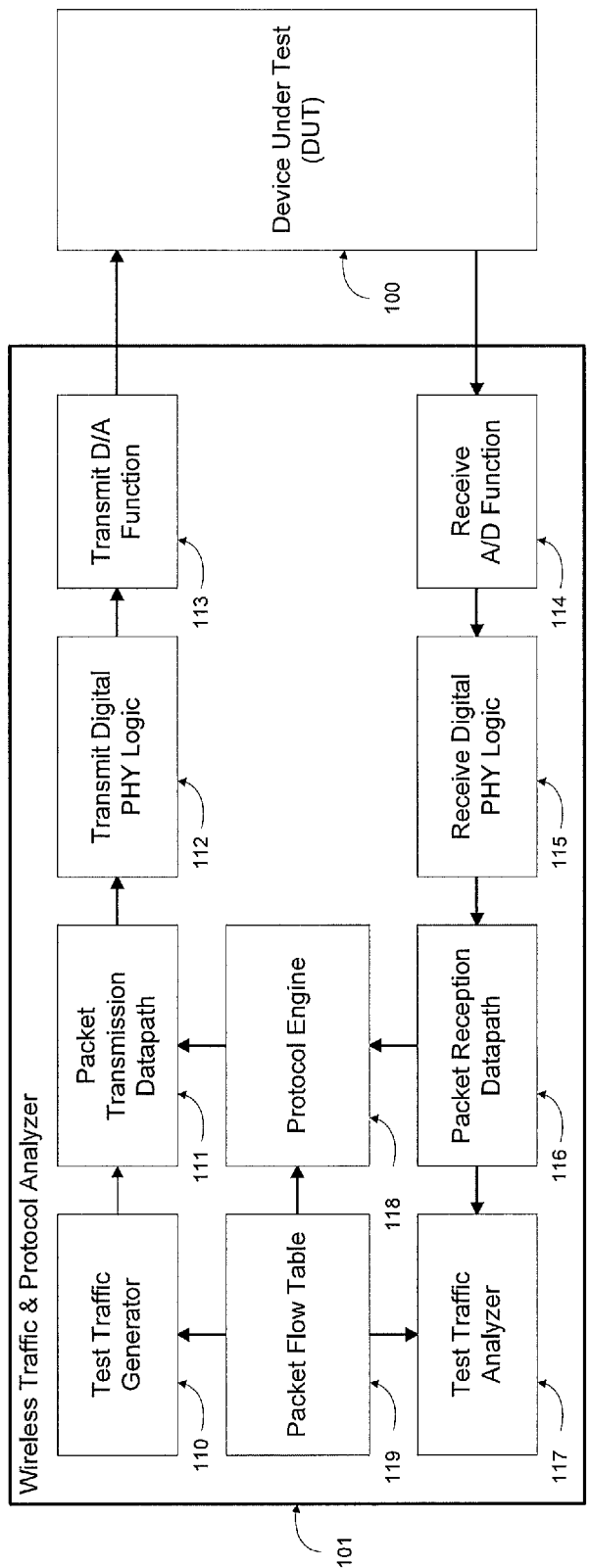
FIG. 2 provides an illustrative diagram of an exemplary conventional wireless traffic and protocol analyzer.
Figure 3:
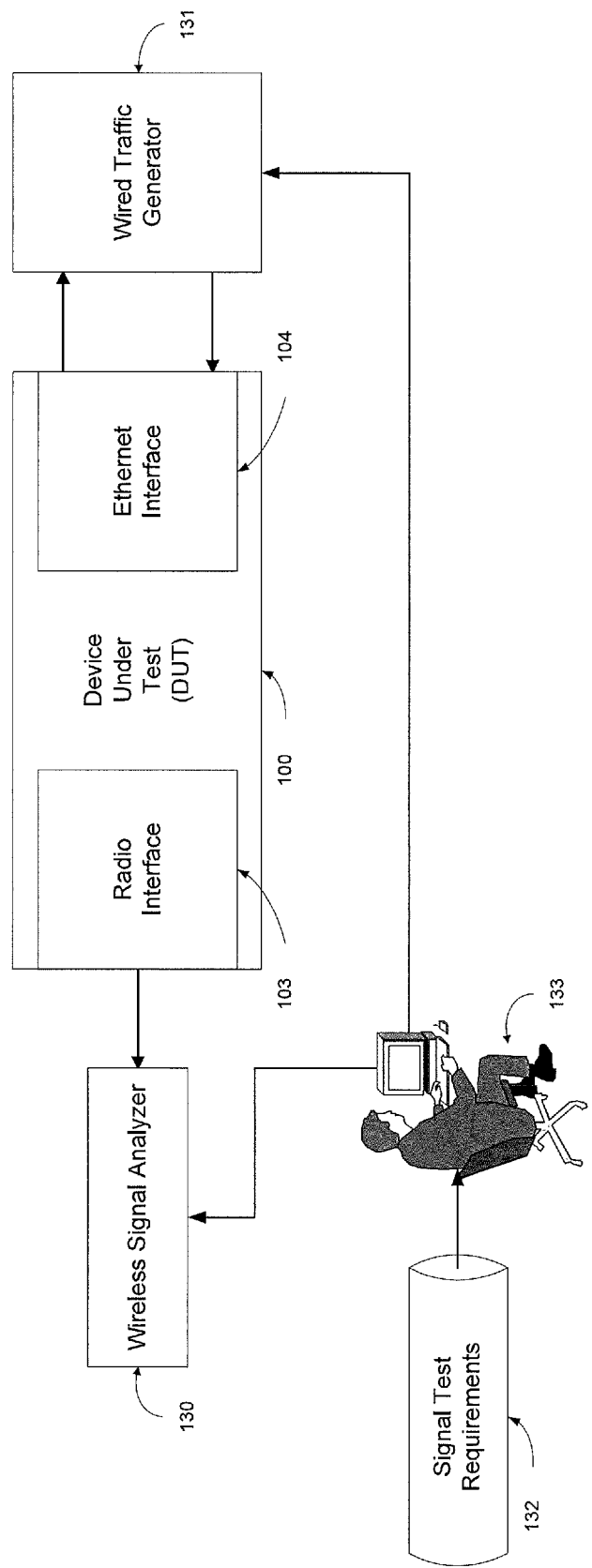
FIG. 3 represents a simplified view of an illustrative conventional test setup for performing wireless signal analysis.
Figure 4:
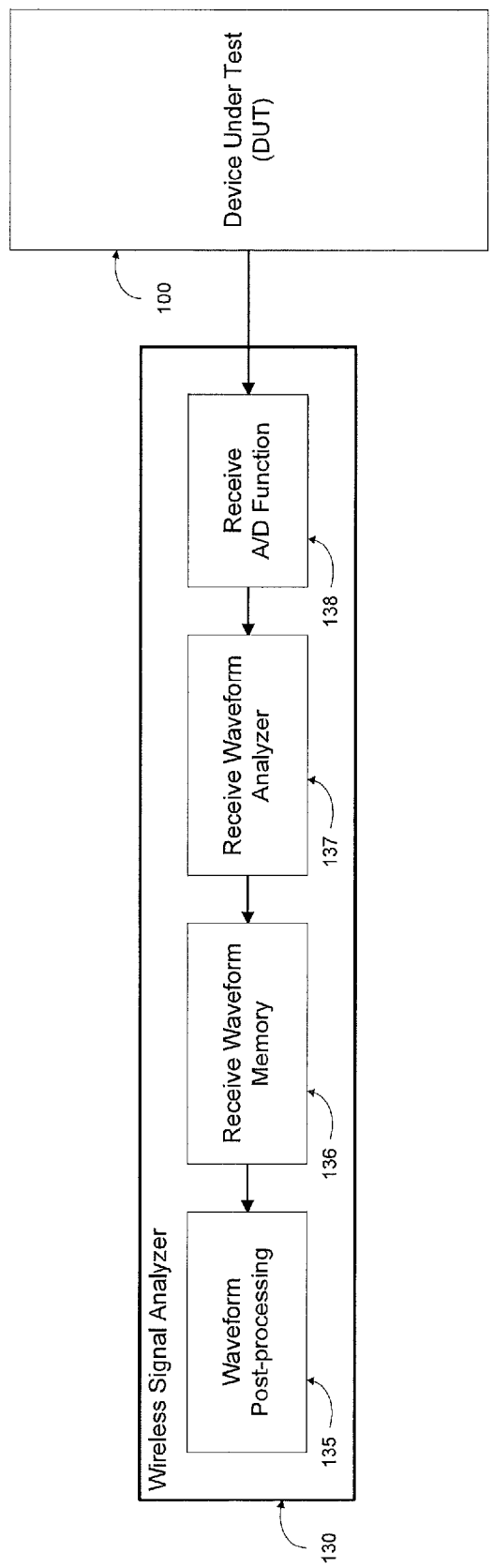
FIG. 4 shows an illustrative diagram of an exemplary conventional wireless signal generator and wireless signal analyzer.
Figure 5:
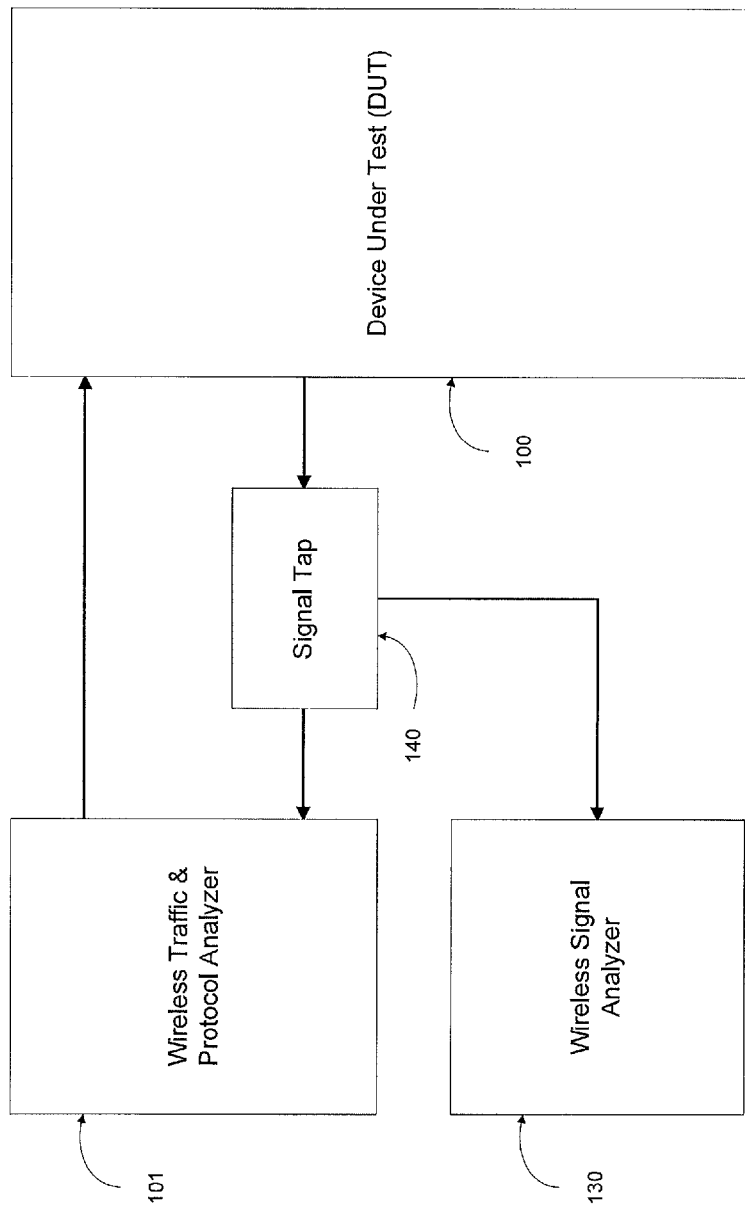
FIG. 5 provides an exemplary block diagram of a conventional test system that is capable of performing both wireless traffic tests and wireless signal analysis.
Figure 6:
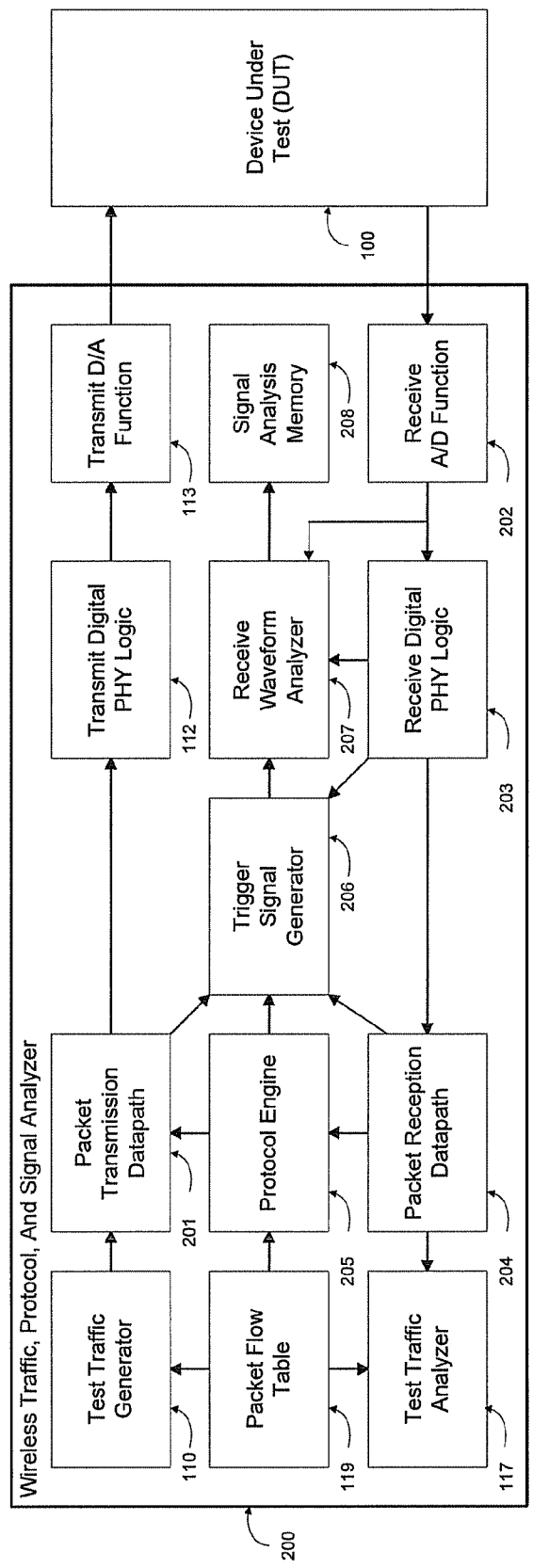
FIG. 6 exemplifies a block diagram of a combined wireless traffic, protocol and signal analyzer, in accordance with an embodiment of the subject matter described herein.

With reference to FIG. 6, an embodiment of a combined wireless traffic, protocol and signal analyzer 200 that may be used for testing Device Under Test (DUT) 100 may preferably comprise: test traffic generator 110; packet transmission datapath 201; transmit digital Physical Layer (PHY) logic 112; transmit Digital to Analog (D/A) function 113; receive Analog to Digital (A/D) function 202; receive digital PHY logic 203; packet reception datapath 204; test traffic analyzer 117; packet flow table 119; protocol engine 205; trigger signal generator 206; receive waveform analyzer 207; and signal analysis memory 208. Wireless traffic, protocol and signal analyzer 200 may enable the improved analysis of signal waveforms generated by DUT 100, and may further enable the analysis to be coordinated with protocol interactions corresponding to a wireless communication protocol of interest.

Suitable wireless communication protocols are exemplified by IEEE 802.11 Wireless LAN and Fourth Generation Long Term Evolution (4G LTE).

Test traffic generator 110 may be operative to generate a stream of test data packets to be transmitted to DUT 100 for purposes including traffic and Quality of Service (QoS) test. These test data packets may be generated to represent traffic flows originating from a plurality of sources, e.g., IEEE 802.11 Stations (STAs) or 4G LTE User Equipments (UEs), in the case of wireless communication protocols that multiplex sources on to a single channel. Packet flow table 119 may supply test data traffic stream definitions to test traffic generator 110 for this purpose. The test data packets may be formatted with all of the ISO/OSI Layer 3-7—i.e., Internet Protocol (IP) Layer up to Application Layer—information required, and may further contain actual or simulated payloads that may be deemed necessary for the requirements of the particular traffic test being conducted.

The stream of test data packets is fed to packet transmission datapath 201, which may combine these test data packets with protocol management/control packets from protocol engine 205 and may then further implement the transmit Medium Access Control (MAC) functions required by the wireless communication protocol supported by DUT 100. Further, packet transmission datapath 201 may encapsulate the test data packets with a MAC header and trailer, and may further encapsulate packets into a Physical Layer Convergence Protocol (PLCP) format. The output of packet transmission datapath 201 is a stream of framed data, which may be rate-adapted to a bit rate corresponding to the PHY parameters of the wireless communication protocol.

The framed data stream is passed to transmit digital PHY logic 112 for digital baseband processing and conversion to a digital bitstream. Such processing may include typical wireless PHY functions such as scrambling, coding, modulation, space/time mapping, symbol generation, filtering and digital upconversion. Transmit digital baseband processing required for different wireless communication protocols, for example IEEE 802.11 or 4G LTE, is well known in the art and will not be described here. After digital baseband processing, the digital bitstream is passed to transmit D/A function 113, which may perform PHY functions such as translation to the analog domain, upconversion, filtering and amplification, again according to the wireless communication protocol of interest. The resulting analog signal may typically be in the RF domain, and is fed to DUT 100. It should be understood that transmission of the signal may occur over cables, antennas, or any other suitable physical means relevant to the test setup; the actual transmission media and method is not germane to the aspects of this or any other embodiment.

In the receive direction, DUT 100 may generate an analog signal (typically in the RF domain) accepted by receive A/D function 202, which may perform PHY functions including amplification, filtering, downconversion, and translation to the digital domain. The digital bitstream that may be generated by this procedure is fed to receive digital PHY logic 203, which may convert the bitstream into a stream of framed data, and may further perform typical wireless PHY functions such as digital downconversion, filtering, channel estimation, symbol synchronization and extraction, space/time demapping, demodulation, decoding, Forward Error Correction (FEC) and descrambling. Receive digital baseband processing required for different wireless communication protocols, for example IEEE 802.11 or 4G LTE, is well known in the art and will not be described here. The framed data stream may further be rate-adapted and PHY errors may be detected. Multiple digital bitstreams may be originated by receive A/D function 202; for example, a filtered bitstream may be passed to receive digital PHY logic 203, and a raw baseband bitstream prior to digital signal processing may be sent to receive waveform analyzer 207.

The framed digital bitstream from receive digital PHY logic 203 is passed to packet reception datapath 204, which may perform functions including PLCP frame decapsulation, detection of PLCP errors, and receive MAC functions required by the wireless communication protocol supported by DUT 100. The outputs from packet reception datapath 204 may include test data packets, which may further be divided into packet types, including test traffic packets, which may be passed to test traffic analyzer 117 for packet and traffic analysis, and protocol management/control packets, which may be passed to protocol engine 205. Packet reception datapath may further be operative to distinguish between packets corresponding to a plurality of destinations, such as STAs or UEs, and may further distinguish a plurality of traffic flows directed to each destination. Packet reception datapath 204 may therefore inspect fields within the test data packets and may inspect the state of MAC protocol functions when distinguishing between these packets. Indications pertaining to such distinguishment functions may be passed to protocol engine 205 as well as test traffic analyzer 117 together with corresponding packets.

Test traffic analyzer 117 may be operative to process and analyze the test data packets received from DUT 100 for purposes that may include deriving metrics of traffic performance and QoS. Test traffic analyzer 117 may further be operative to handle multiple streams of traffic that may be multiplexed within the set of received test data packets, which may be indicated by distinguishment functions implemented within packet reception datapath 204.

Protocol engine 205 implements protocol state machines and functions that may be necessary for wireless communication protocols used by DUT 100, for example IEEE 802.11 or 4G LTE. These protocol state machines and functions may accept protocol management/control packets from packet reception datapath 204 and may further generate protocol management/control packets to packet transmission datapath 201. Protocol functions performed within protocol engine 205 may include those at Layers 2-7 of the ISO/OSI protocol stack.

Wireless traffic, protocol and signal analyzer 200 may support a plurality of endstations (STAs or UEs) and may further support a plurality of traffic flows to/from these destinations. Descriptions of these endstations and traffic flows are maintained in packet flow table 119, which may provide information on the flows to be generated to test traffic generator 110; the flows to be analyzed to test traffic analyzer 117; and endstations and active traffic flows to protocol engine 205 for use within the wireless communication protocol.

Trigger signal generator 206 may accept indications from a plurality of sources, which may include protocol engine 205, packet transmission datapath 201, packet reception datapath 204, and receive digital PHY logic 203. The logic may be operative to combine these indications in some algorithmic and predetermined fashion to generate a trigger signal to receive waveform analyzer 207. This trigger signal may further include indications of time when signal capture should occur and duration of signal capture. Further, trigger signal generator 206 may generate multiple trigger signals to denote a plurality of events that may require signal capture. The time and duration of capture may be different for each one of the plurality of events. Yet further, trigger signal generator 206 may generate indications regarding the start and end of PLCP and MAC frames within the receive signal, and may also generate indications regarding the start and end of symbols within these PLCP and MAC frames. Still further, trigger signal generator 206 may generate identifying indications regarding specific traffic flows and specific endstations, such as STAs and UEs. Trigger signal generator 206 may thereby permit automatic triggering of waveform analyzer 207 conditioned by predetermined settings that may be required by the test functions.

Receive waveform analyzer 207 accepts a digital bitstream from receive A/D function 202. This digital bitstream may be obtained from a plurality of sources within the processing path implemented within receive A/D function 202, including but not limited to the raw digital bitstream produced immediately after digitization and before filtering. It should be apparent to those of ordinary skill in the art that a suitable tradeoff may be made between the sampling rate and consequent bandwidth of receive waveform analyzer 207 versus the amount of information that may be extracted from the received signal from DUT 100.

Receive waveform analyzer 207 may further be operative to perform a plurality of analysis functions on the received signal from DUT 100. Such analysis functions may include: computing the modulation accuracy according to a metric, one possible metric well known in the art being the Error Vector Magnitude (EVM); determining the spectral characteristics according to a metric, one possible metric well known in the art being the Power Spectral Density (PSD); determining the compliance of the signal to a suitable mask; analyzing the average signal to noise ratio; and determining amplitude and phase flatness of subcarriers, including pilot subcarriers. Further, such analysis functions may be conditioned by frame, symbol, traffic flow and endstation indications that may be received from trigger signal generator 206, thereby permitting analysis functions to be computed on different boundaries such as frame boundaries and symbol boundaries, as well as associating analysis functions with specific traffic flows and endstations. These traffic flows and endstations may be associated with unique identifiers.

The analysis results output by receive waveform analyzer 207 may be stored in signal analysis memory 208 for retrieval. Signal analysis memory 208 may further store, in conjunction with the analysis results, a plurality of traffic related indications, such as frame and symbol boundaries, and traffic flow and endstation identifiers.

Operation of combined wireless traffic, protocol and signal analyzer 200 is straightforward. Analyzer 200 may be configured with required functions, which may include definitions of endstations and traffic flows, and may also include actions to be performed and measurements to be made. Protocol engine 205 may perform any appropriate protocol handshakes with DUT 100 that may be necessary to connect endstations and begin traffic flows. Test traffic measurements may be made by test traffic analyzer 117 acting in conjunction with test traffic generator 110 and packet flow table 119. The properties of the waveform received from the DUT may be measured by receive waveform analyzer 207 in conjunction with signal analysis memory 208. Trigger signal generator 206, which may have been configured to trigger receive waveform analyzer upon a plurality of desired events and conditions, may detect the existence of these events and conditions and may automatically trigger receive waveform analyzer 207 to selectively make measurements. These measurements are made and stored either upon user command or automatically. At some convenient juncture, data stored in signal analysis memory 208 may be read out. This read may be performed either while the system is running (exemplifying real-time measurements) or while the system has been stopped.

Figure 7:
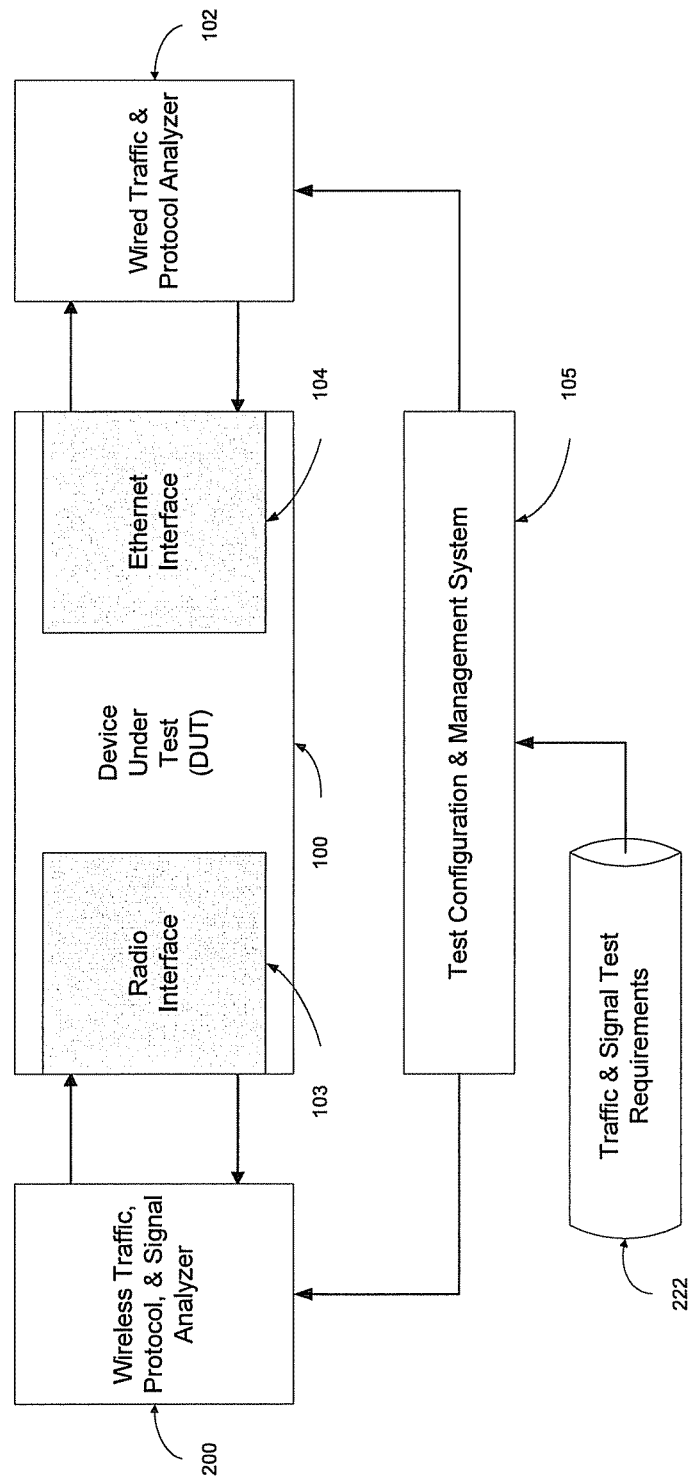
FIG. 7 illustrates a possible test setup showing one usage of a combined wireless traffic, protocol and signal analyzer in accordance with an embodiment of the subject matter described herein.

Turning now to FIG. 7, the general arrangement of a test setup for performing wireless signal analysis on a data communications DUT in accordance with an embodiment of a combined wireless traffic, protocol and signal analyzer may preferably include wireless traffic, protocol and signal analyzer 200 interfaced to radio interface 103 of DUT 100 and wired traffic and protocol analyzer 102 interfaced to Ethernet interface 104 of DUT 100. Test configuration and management system 105 may preferably control both wireless traffic, protocol and signal analyzer 200 and wired traffic and protocol analyzer 102, possibly by downloading traffic and signal analysis configurations and then starting traffic flow between the analyzers. These configurations may be obtained using a set of stored traffic and signal test requirements 222.

It will be appreciated that automatic analysis of signal waveforms generated by DUT 100 may be feasible with the arrangement depicted in FIG. 7, by virtue of the programmatic coupling between wireless test traffic and protocol functions and wireless signal analysis within analyzer 200. This may be facilitated by configuring trigger signal generator 206 with a predetermined duration of signal analysis and a predetermined set of input conditions, corresponding to a type of packet or portion of DUT 100 waveform, and then configuring test traffic generator 110 utilizing entries in packet flow table 119 to cause these packets or waveforms to be generated by DUT 100. Protocol engine 205 is may then be activated to perform the necessary protocol handshakes, according to the wireless communication protocol implemented by DUT 100, that will permit the test traffic to be forwarded by DUT 100 to receive A/D function 202. After the particular type of packet or waveform has been observed by receive digital PHY logic 203 and packet reception datapath 204, trigger signal generator 206 will trigger receive waveform analyzer 207 to analyze the desired signals and store the results in signal analysis memory 208. It is readily apparent that the process of detecting, analyzing and storing the waveform analysis results requires no human intervention, in spite of the complex and unpredictable nature of wireless protocols.

Figure 8:
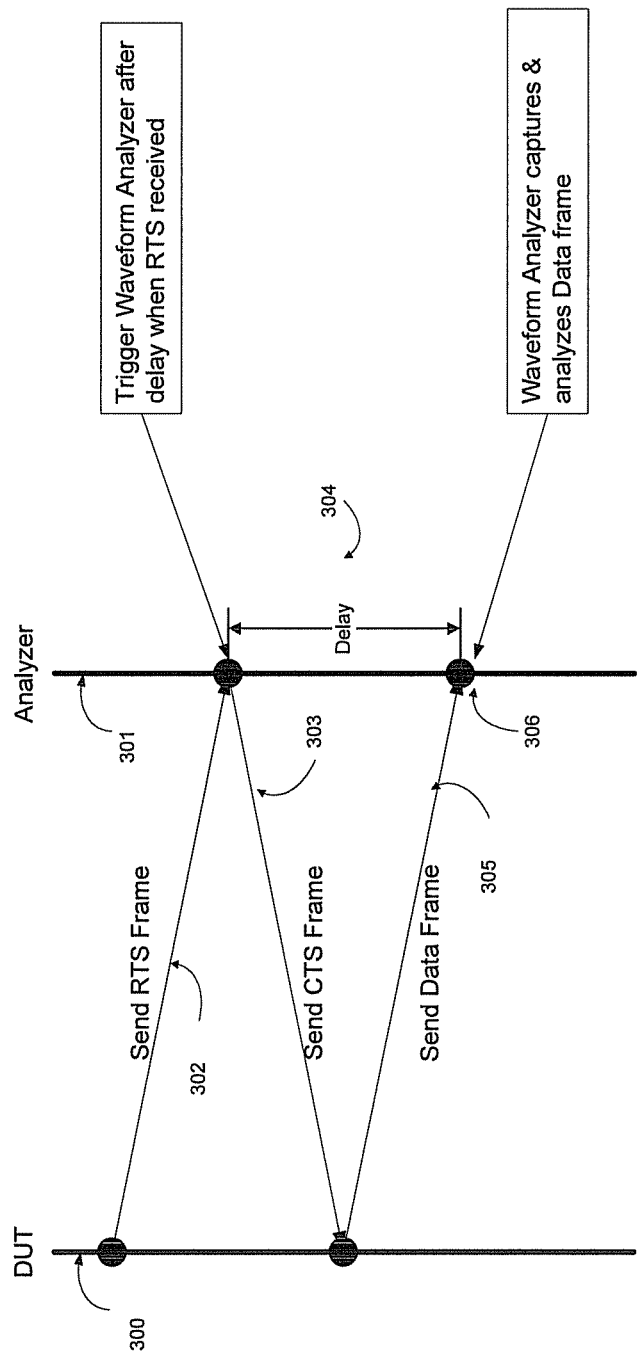
FIG. 8 represents the steps of an exemplary method of selectively performing a signal waveform analysis using an RTS/CTS protocol exchange in accordance with an embodiment of the subject matter described herein.

FIG. 8 depicts an exemplary situation of selective and automatic capture and analysis of the signal waveform generated by DUT 100 in accordance with an embodiment of the subject matter described herein. Vertical line 300 represents the sequence of packets transmitted and received by DUT 100, whereas vertical line 301 represents packets transmitted and received by analyzer 200. In this situation, corresponding to the IEEE 802.11 RTS/CTS protocol, DUT 100 transmits a Request To Send (RTS) frame to analyzer 200, indicating that it wishes to transmit a data frame 305 of a pre-specified size. Analyzer 200 may then transmit a Clear To Send (CTS) frame 303 back to DUT 100, indicating that it is ready to accept data frame 305. At the same time, protocol engine 205 may indicate to trigger signal generator 206 that an RTS/CTS handshake is being performed, and may further indicate the size of the pending data frame 305. Trigger signal generator 206 may then determine based on preconfigured parameters that the data frame is one for which analysis is desired. As the delay between the receipt of RTS frame 302 and the associated data frame 305 is fixed and well specified in the IEEE 802.11 protocol, trigger signal generator 206 may then wait for this fixed delay and then generate a trigger signal to waveform analyzer 207, and may further indicate the analysis duration corresponding to the value provided in RTS frame 302. Waveform analyzer 207 may then perform signal analysis for the appropriate duration required to fully analyze data frame 305 transmitted by DUT 100, and may further utilize the trigger parameters to exclude all extraneous signals and packets.

It will be immediately appreciated that the resulting analysis may provide all of the relevant signal information for the desired data frame 305 without including any extraneous information from RTS frame 302 and CTS frame 303. The amount of waveform analysis data that must be stored in signal analysis memory 208 may therefore be tremendously reduced.

It will also be appreciated that analysis of data frame 305 may be feasible even if it is severely corrupted by noise or distortion. This is because according to the IEEE 802.11 protocol RTS frame 302 is normally transmitted at a much lower PITY bit rate than data frame 305, using a much more robust modulation method. Therefore, RTS frame 302 may be decodable without errors even if data frame 305 is not decodable. The information present within RTS frame 302 may preferably be used to precisely predict the time and duration of data frame 305, and permit all or some portion of the signals for data frame 305 to be analyzed, even though data frame 305 may not itself be decodable. Without utilizing the information present within RTS frame 302, data frame 305 may be indistinguishable from random noise and it may not be possible to analyze its signal. The determinism and predictability of the analysis process may therefore be tremendously improved.

Figure 9:
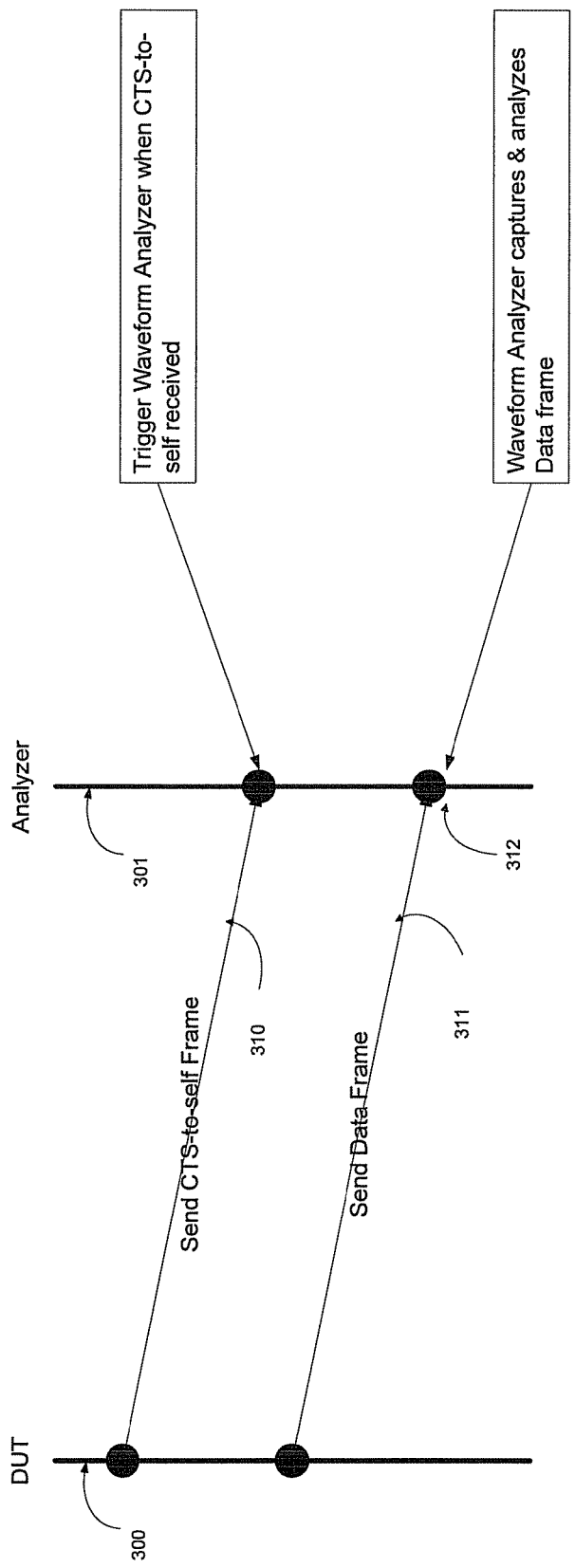
FIG. 9 represents the steps of an exemplary method of selectively performing a signal waveform analysis using a CTS-to-self protocol exchange in accordance with an embodiment of the subject matter described herein.

Another exemplary situation of selective and automatic capture and analysis that may be facilitated by the subject matter described herein is depicted in FIG. 9. Again, vertical lines 300 and 301 represent packets transmitted/received by DUT 100 and analyzer 200 respectively. In this exemplary instance, DUT 100 is using the IEEE 802.11 CTS-to-self protocol exchange to perform its transmissions: it transmits a CTS frame at 310, and subsequently the corresponding data frame at 311. The initial CTS frame 310 contains information providing the duration of the succeeding data frame 311. Analyzer 200 therefore may be configured to trigger waveform analysis upon receipt of CTS frame 310, utilizing the duration information to determine the length of time for which analysis should be performed to capture all of the signals corresponding to data frame 311 without including any extraneous data.

It is readily apparent that the same benefits deriving from the previous exemplary situation, i.e., reduction in stored waveform data, automated determination of target signal data, and predictability of analysis, may also be derived herein. It will be further appreciated that the operative coupling of protocol engine 205 and trigger signal generator 206, and preferably including the ability to configure trigger signal generator 206 responsive to one or more of a plurality of different protocol handshakes, may permit a highly flexible waveform capture and analysis capability.

In many test scenarios it may be advantageous to distinguish a single one of such a plurality of interleaved traffic flows and selectively perform waveform measurements upon only the single flow. As one exemplary scenario, the signal quality assigned to the traffic flow by DUT 100 may be assessed and verified relative to the QoS labeling that may be present within TCP/IP header 321. As another exemplary scenario, a frame error problem that may selectively affect one of a plurality of interleaved traffic flows may be isolated and analyzed independently of all of the other traffic flows. It will be appreciated that the operative coupling of packet reception datapath 204 with trigger signal generator 206 may facilitate the selective analysis of received signal waveforms according to an arbitrary field within packets.

Figure 10:
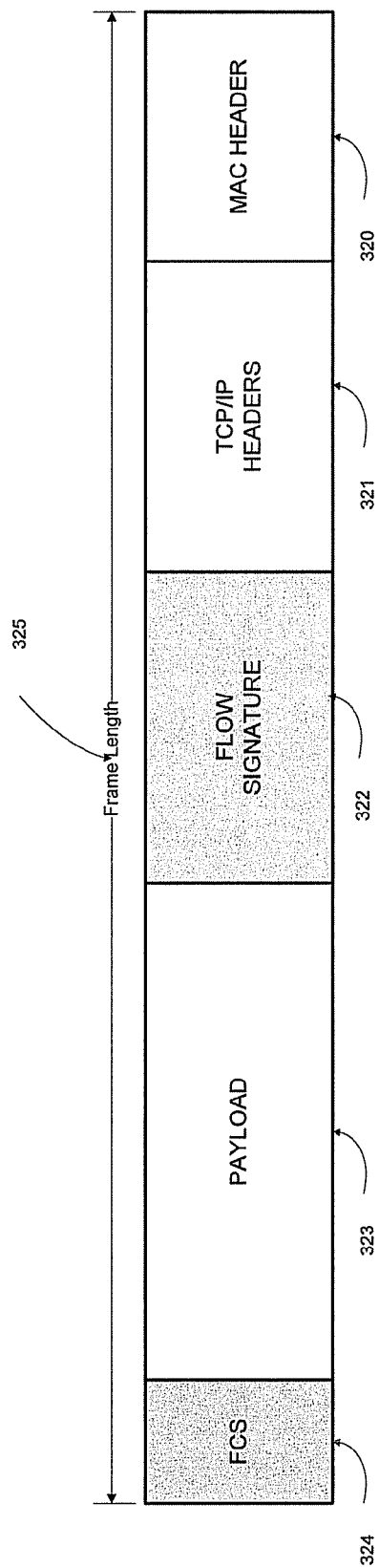
FIG. 10 shows an exemplary data packet that may be received from a DUT.

Turning now to FIG. 10, an exemplary data packet generated by DUT 100 is depicted, which may comprise fields such as MAC header 320, TCP/IP headers 321, payload 323 and MAC Frame Check Sequence (FCS) field 324. Payload 323 of the packet may further contain a flow signature field 322 inserted by test traffic generator 110. Signature field 322 may preferably contain information including a flow identifier corresponding to the traffic flow to which the packet belongs, endstation identifiers denoting the endstations for the traffic flow, timestamp information, and sequence number information for determining whether packets have been lost or misordered. Signature field 322 may be processed by test traffic analyzer 117 to determine flow statistics, which may include metrics such as forwarding rate, loss, latency and jitter. The length 325 of this exemplary data packet is dependent on the number of bytes present in the payload and headers, but may at least be large enough to hold signature 322.

Figure 11:
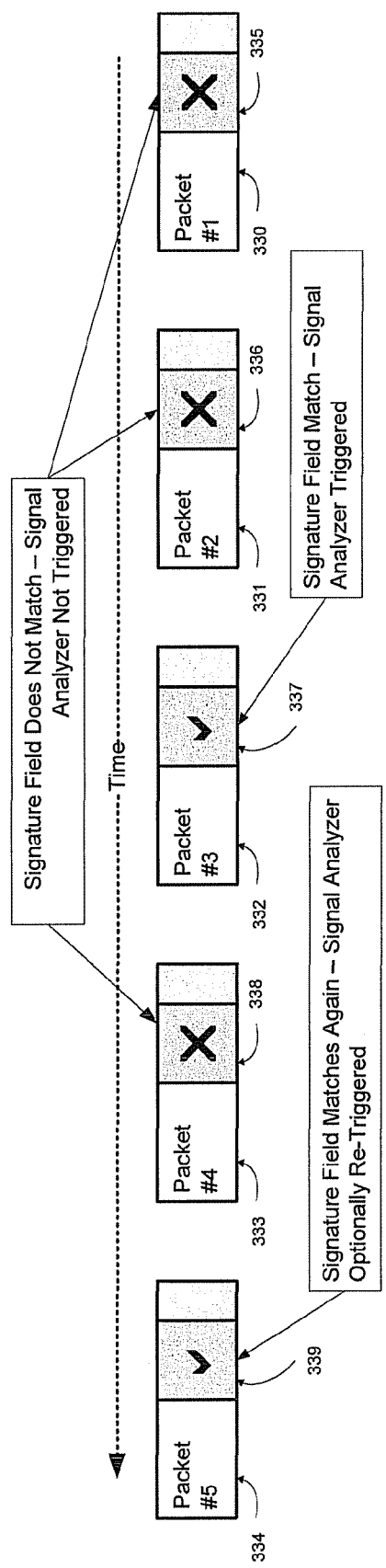
FIG. 11 depicts an exemplary method of selective signal analysis of a plurality of data packets based on the decoded contents of these data packets in accordance with an embodiment of the subject matter described herein.

FIG. 11 depicts part of an exemplary stream of packets formatted according to FIG. 10 representing a plurality of interleaved traffic flows contained within test traffic received from DUT 100 by analyzer 200. The portion of the packet stream depicted consists of packets 330, 331, 332, 333, and 334, containing signature fields 335, 336, 337, 338 and 339 respectively. In this exemplary scenario, only packets 332 and 334 may correspond to a particular traffic flow of interest, as indicated by flow identifiers present in signature fields 337 and 339; the remaining packets correspond to other traffic flows and may not be of interest. Selective waveform analysis may be performed for the signals associated with the specific traffic flow to which packets 332 and 334 belong. Preferably, packet reception datapath 204 may be configured to perform a pattern match for the flow identifier within signature fields 335, 336, 337, 338 and 339 corresponding to this traffic flow, and to output a signal to trigger signal generator 206 whenever the specified flow identifier is found. In this exemplary situation, packets 332 and 334 may result in a signal being output to trigger signal generator 206, which in turn may trigger waveform analyzer 207 to perform signal analysis for these two packets and store the result in signal analysis memory 208. The other packets are not analyzed. Therefore, signal analysis memory 208 may preferably contain only the information pertaining to the traffic flow of interest.

Figure 12:
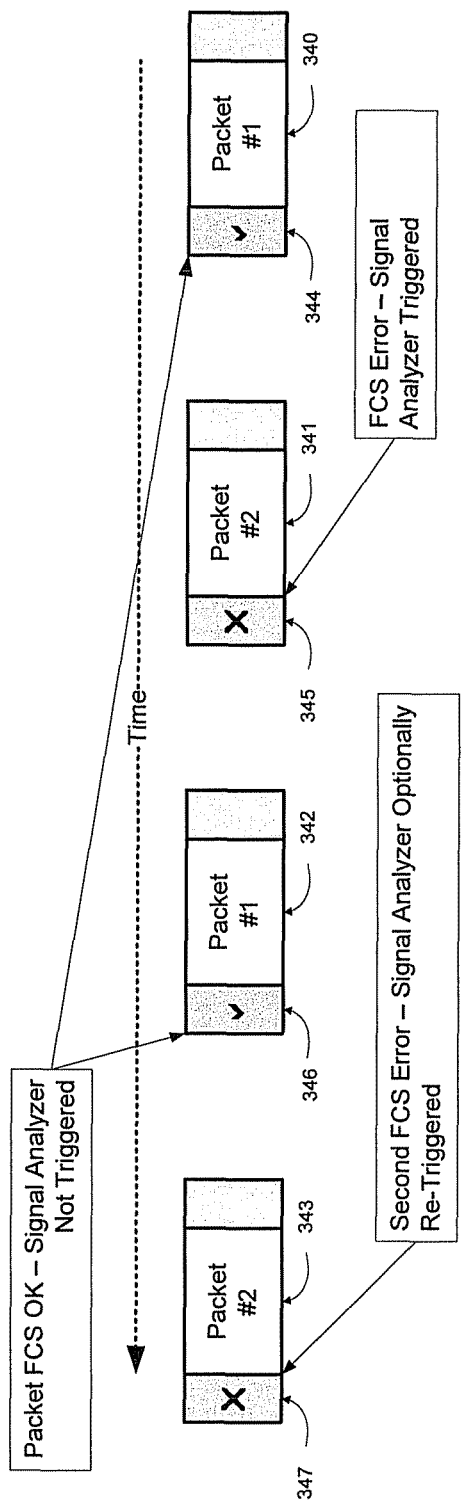
FIG. 12 depicts an exemplary method of selective signal analysis of a plurality of data packets based on MAC-layer FCS error checks in accordance with an embodiment of the subject matter described herein.

FIG. 12 depicts part of another exemplary stream of packets, again formatted according to FIG. 10, and representing test traffic received from DUT 100 by analyzer 200. The portion of the packet stream depicted consists of packets 340, 341, 342, and 343, with MAC FCS fields 344, 345, 346 and 347 respectively. In this exemplary situation, packets 341 and 343 are subjected to signal distortion and noise resulting in bit errors during reception, which may preferably be indicated by FCS errors detected during the check of FCS fields 345 and 347 respectively. It may then be desired to selectively analyze the signal waveform corresponding to packets 341 and 343, to determine the cause of these FCS errors. Packet reception datapath 204 may be therefore be configured to output a signal to trigger signal generator 206 whenever the packet FCS check fails, and trigger signal generator 206 may further be configured to trigger waveform analyzer 207 thereby, the analysis results being stored in signal analysis memory 208. This may cause analysis to be performed on the signal waveforms comprising packets 341 and 343 without including packets 340 and 342 in the analysis results. Therefore, signal analysis memory 208 may preferably contain only analysis results obtained from packets with FCS errors.

Figure 13:
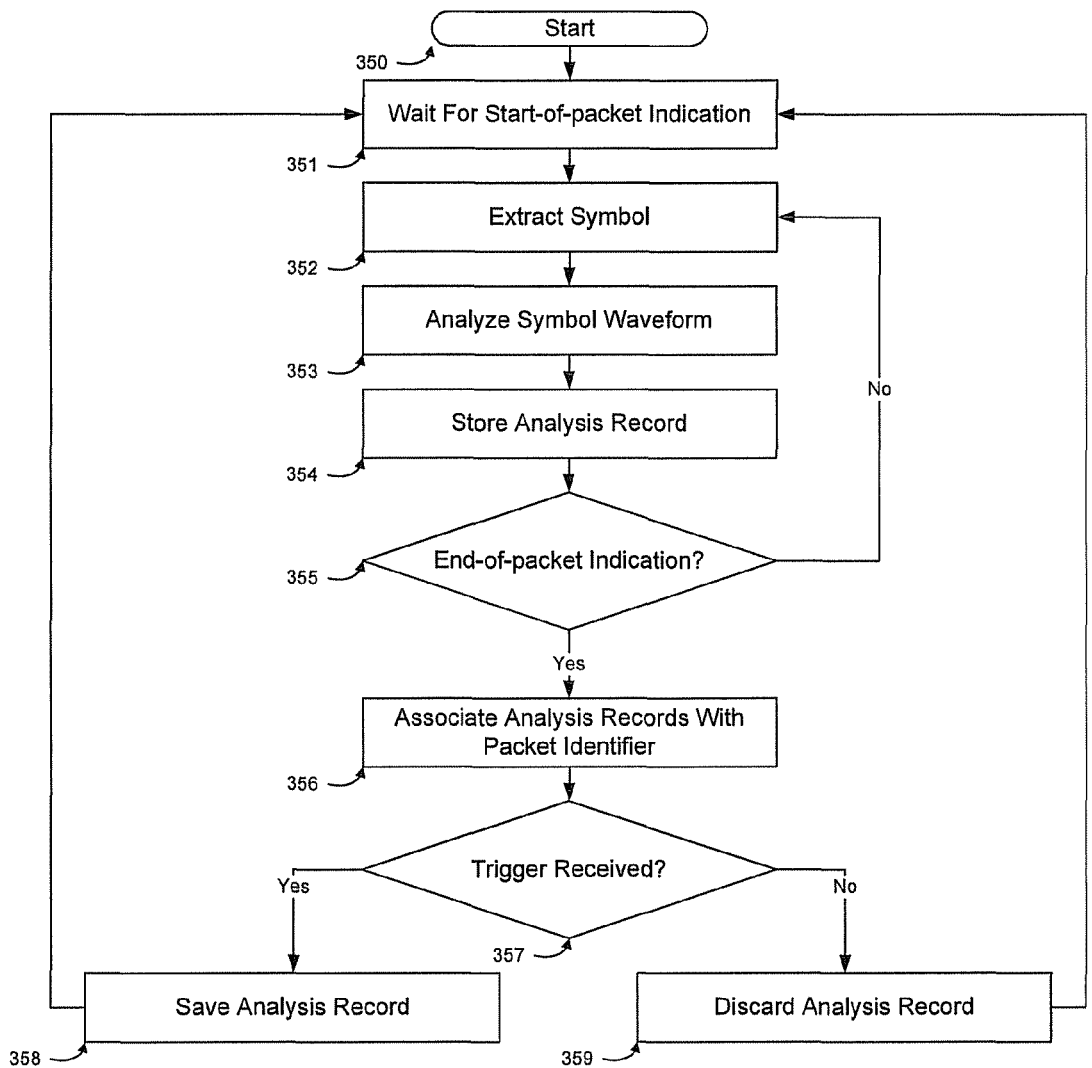
FIG. 13 shows an illustrative flow chart, representing a possible series of steps for post-triggering signal waveform analysis according to decoded packet information, in accordance with an embodiment of the subject matter described herein.

Post triggering signal waveform analysis may be desirable in situations where the signal waveform to be analyzed precedes the determination of the need to analyze the waveform, for example when a packet FCS check that may performed at the end of a packet indicates that the packet contains bit errors and therefore the packet waveform may need to be analyzed. With reference to FIG. 13, an exemplary flow chart illustrating one possible series of steps for post-triggering signal waveform analysis is depicted, which may follow the steps of:

a) At step 350, beginning the process of post-triggering;
b) At step 351, waiting for a start-of-packet indication that may denote the beginning of a data packet;
c) At step 352, extracting a symbol from the incoming signal waveform;
d) At step 353, analyzing this symbol waveform according to an analysis requirement;
e) At step 354, storing the analysis record, preferably into signal analysis memory 208;
f) At step 355, determining if an end-of-packet indication has been received, that may correspond to the end of the incoming packet, and, if not received, returning to step 352 to extract and analyze the next symbol;
g) At step 356, when the end-of-packet indication has been received, associating the stored analysis records with the received packet, preferably using a packet identifier;
h) At step 357, checking if a trigger has been received, preferably from trigger signal generator 206;
i) At step 358, if a trigger has been received, saving the analysis record, and returning to step 351 to wait for the next start-of-packet indication; and
j) At step 359, if a trigger has not been received, discarding the analysis record, and returning to step 351 to wait for the next start-of-packet indication.

Figure 14:
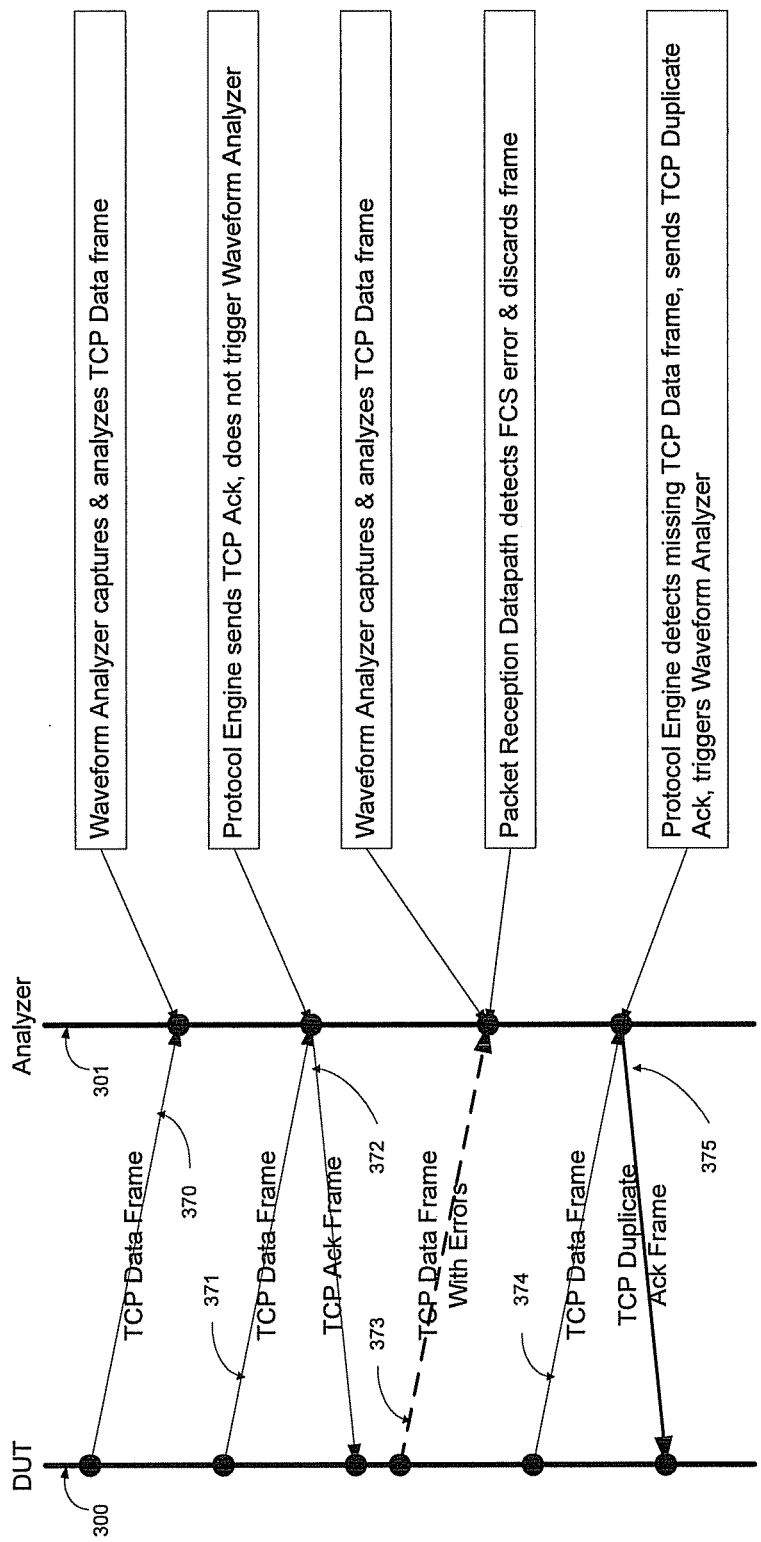
FIG. 14 represents an exemplary method of selective signal waveform analysis based on TCP protocol errors in accordance with an embodiment of the subject matter described herein.

Referring now to FIG. 14, an exemplary procedure is shown whereby analyzer 200 may be responsive to a TCP error to analyze the waveform of the corresponding data frame, illustrative of the ability of analyzer 200 to perform signal analysis functions on the basis of upper-layer protocol information, for instance the Layer 4 of the ISO/OSI protocol stack. Vertical lines 300 and 301 represent the events and frames at DUT 100 and analyzer 200 respectively. In this exemplary instance, DUT 100 may transmit a plurality of TCP data frame 370, 371, 373, 374 to analyzer 200, which may represent a portion of a TCP data stream. Responsive to the received TCP data frame and the TCP protocol, analyzer 200 may transmit TCP acknowledgement (Ack) frame 372 and TCP duplicate acknowledgement (DupAck) frame 375. At TCP data frame 373, a signal distortion or noise may cause the frame to be received with errors, and it may preferably be necessary to selectively analyze this data frame to determine metrics that may include EVM and PSD. This may be accomplished by configuring protocol engine 205 to output a signal to trigger signal generator 206 whenever a TCP DupAck frame is transmitted, as a TCP DupAck normally indicates the failure to receive a TCP data frame. Further, packet reception datapath 204 may be configured to output a signal to trigger signal generator 206 whenever a frame with an FCS error is received, in a manner similar to that heretofore described. Trigger signal generator 206 may then operatively combine these two signals and may trigger waveform analyzer 207 to perform signal analysis on the signal corresponding to TCP data frame 373, and store the results in signal analysis memory 208. It may be appreciated that this technique enables the distinguishment and selective analysis of a TCP data frame with errors relative to all other data frames with errors that may be present in the signal received from DUT 100.

Figure 15:
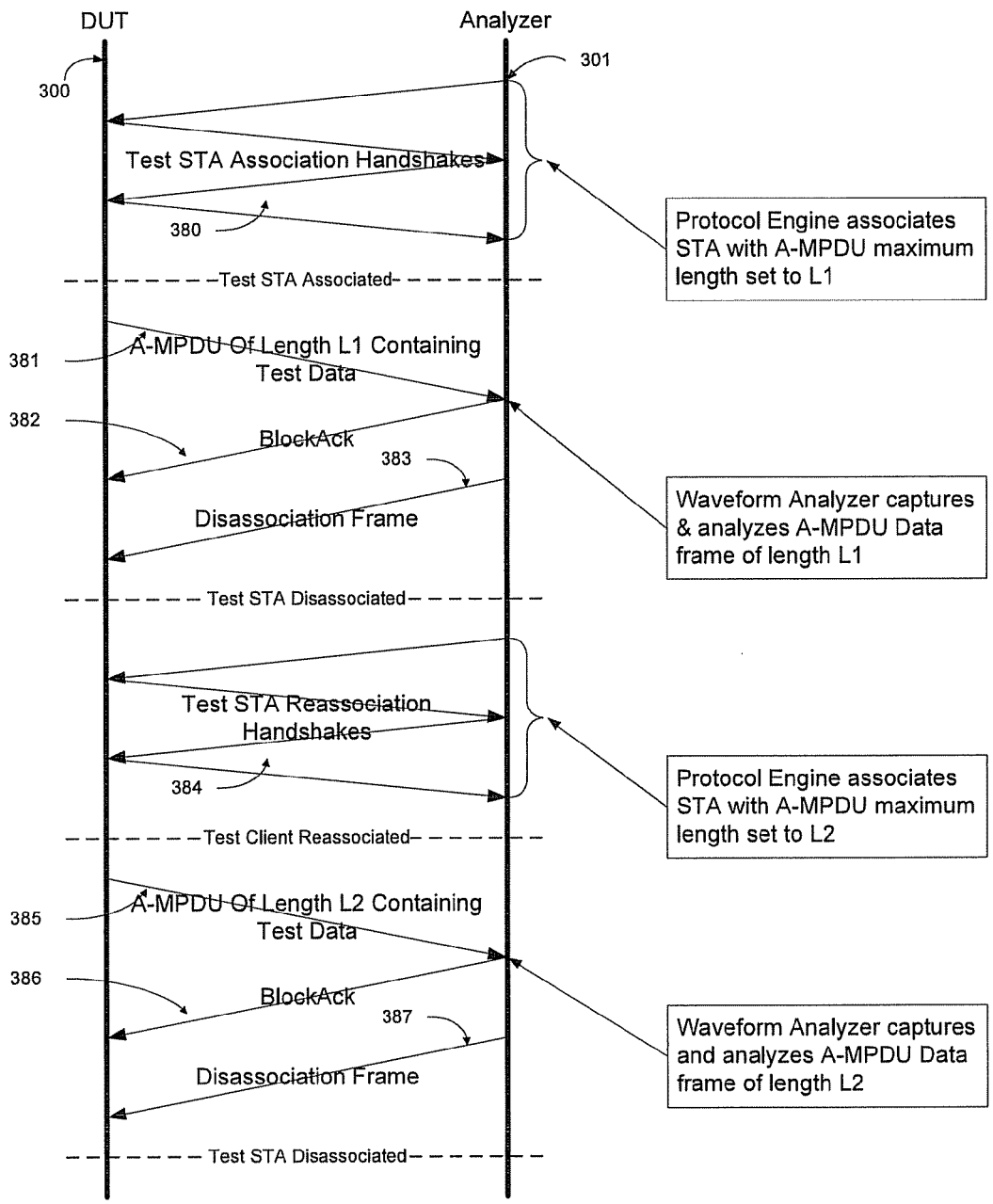
FIG. 15 illustrates a possible sequence for controlling a DUT using a protocol engine and relatedly performing an analysis of signal waveform, in accordance with an embodiment of the subject matter described herein.

Turning now to FIG. 15, an exemplary procedure for performing an automated test over a range of IEEE 802.11 Aggregated MAC Protocol Data Unit (A-MPDU) sizes is depicted. As before, vertical lines 300 and 301 represent the events and frames at DUT 100 and analyzer 200 respectively. At 380, analyzer 200 may associate a test station (STA) with DUT 100 and may use the standard IEEE 802.11 association handshake for this purpose. During association handshake 380, the test STA may indicate that its maximum acceptable A-MPDU length is a certain value, for exemplary purposes denoted as L1. At 381, DUT 100 is caused to transmit at least one burst of data to analyzer 200. It is understood that this may be done in different ways, for example by using wired traffic and protocol analyzer 102 in FIG. 7. As the test STA may have indicated its maximum acceptable A-MPDU length to be the exemplary value of L1, DUT 100 transmits this burst of data contained within A-MPDU 381 of exemplary length L1. Packet reception datapath 204 may have been previously configured to recognize an A-MPDU of exemplary length L1, and may therefore signal the presence of A-MPDU 381 to trigger signal generator 206, which may then generate a trigger indication to waveform analyzer 207, that may performs signal analysis on A-MPDU 381 and may further store the analysis results in signal analysis memory 208. Analyzer 200 may then transmit BlockAck 382 to DUT 100 responsive to A-MPDU 381 in accordance with the IEEE 802.11 protocol.

After reception of A-MPDU 381 and subsequent BlockAck 382, protocol engine 205 may be configured to disconnect the test STA from DUT 100 by means of disassociation frame 383. The system may then be automatically reconfigured for a next test, which may utilize a different A-MPDU length; this may be done, for example, by test configuration and management system 105 responsive to traffic and signal test requirements 222, as depicted in FIG. 7. This may preferably be done by another IEEE 802.11 association handshake 384 for the test STA but this time indicating that the maximum acceptable A-MPDU length is a different value, for exemplary purposes denoted as L2. Once the test STA is associated, DUT 100 may be caused to transmit at least one burst of data as A-MPDU 385 of exemplary length L2. Again, packet reception datapath 204 may have been previously configured to recognize an A-MPDU of exemplary length L2, and may therefore signal the presence of A-MPDU 385 to trigger signal generator 206, which may again cause waveform analyzer 207 to analyze A-MPDU 385 and deposit the analysis results in signal analysis memory 208. Analyzer 200 may then transmit BlockAck 386 to DUT 100 and disconnect the test STA using disassociation frame 387.

This process may be repeated as often as may be necessary to test different lengths of A-MPDUs. It will be appreciated that this process may also be used to test other PHY layer parameters, preferably including parameters such as modulation types, signal bandwidths, data rates, and coding formats, by causing analyzer 200 to modify the parameters negotiated with DUT 100 during the process of associating the test STA.

Figure 16:
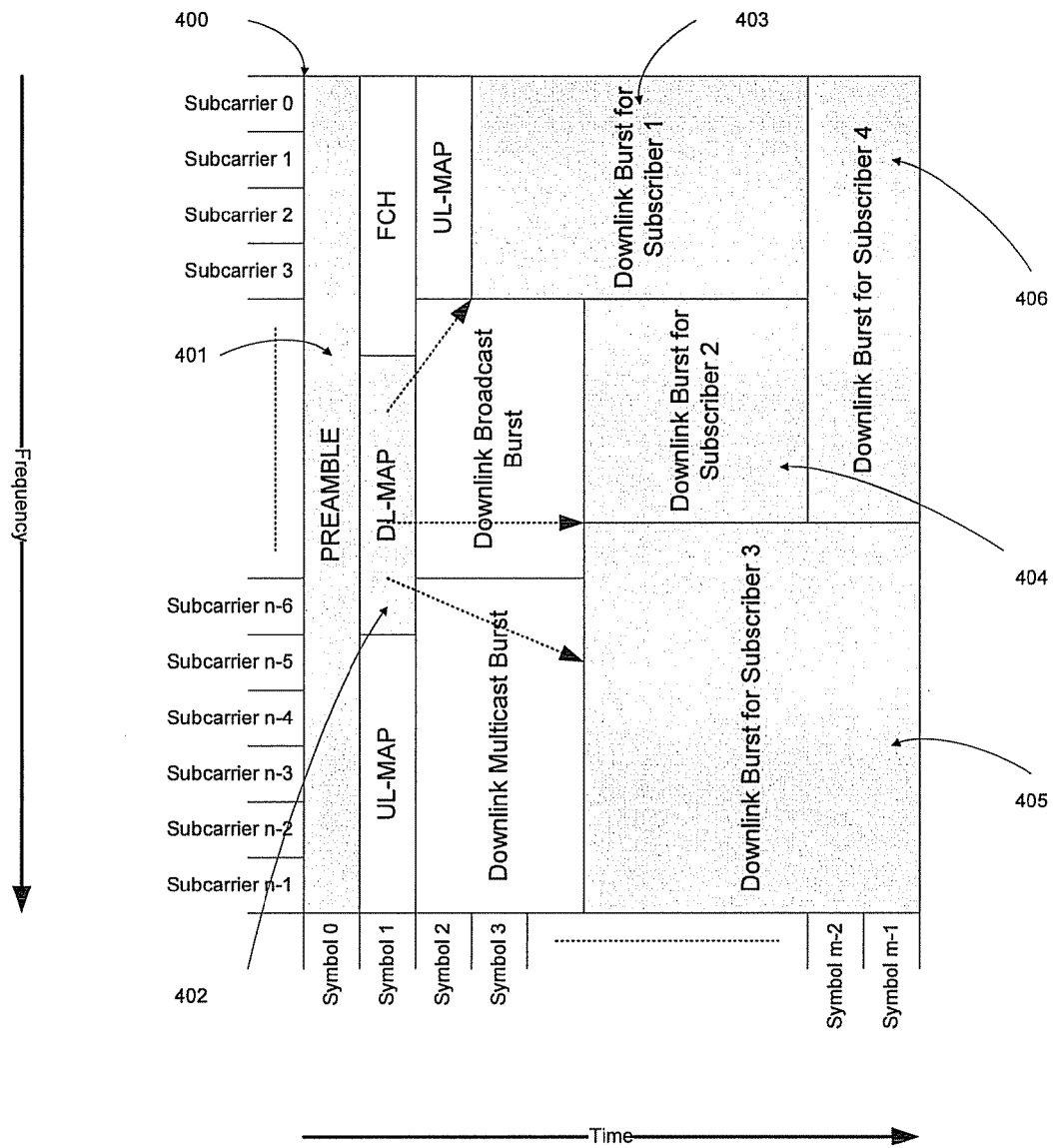
FIG. 16 shows an exemplary Long Term Evolution (LTE) data frame that may be received from a DUT.

FIG. 16 relates to an embodiment of combined wireless traffic, protocol and signal analyzer 200 that may be used for testing a DUT 100 that implements the 4G LTE protocol, and depicts a downlink (DL) frame 400 that may be transmitted by DUT 100 to analyzer 200 in accordance with the 4G LTE protocol. DL frame 400 may comprise a number of fields, of which preamble 401, DL-MAP 402, and downlink subscriber bursts 403, 404, 405 and 406 may be of particular interest. It will be apparent from the figure that 4G LTE may concurrently multiplex data for several subscribers into one DL frame 400, distributing the subscriber data across multiple subcarriers and multiple symbols. For instance, FIG. 16 shows the subscriber 1 downlink burst 403 as occupying subcarriers 0-3 during symbols 2 through m−3, where m may represent the total number of symbols present in DL frame 400. The time/frequency area occupied by each subscriber downlink burst may be determined by decoding the information provided in DL-MAP 402. As different subscriber DL bursts may be transmitted with different signal characteristics, it may be of interest to perform selective signal analysis on individual subscriber bursts. Further, it may be of interest to perform the analysis subject to certain higher-layer protocol criteria, preferably including MAC layer error status, TCP error status, IP addresses, and application QoS requirements.

Figure 17:
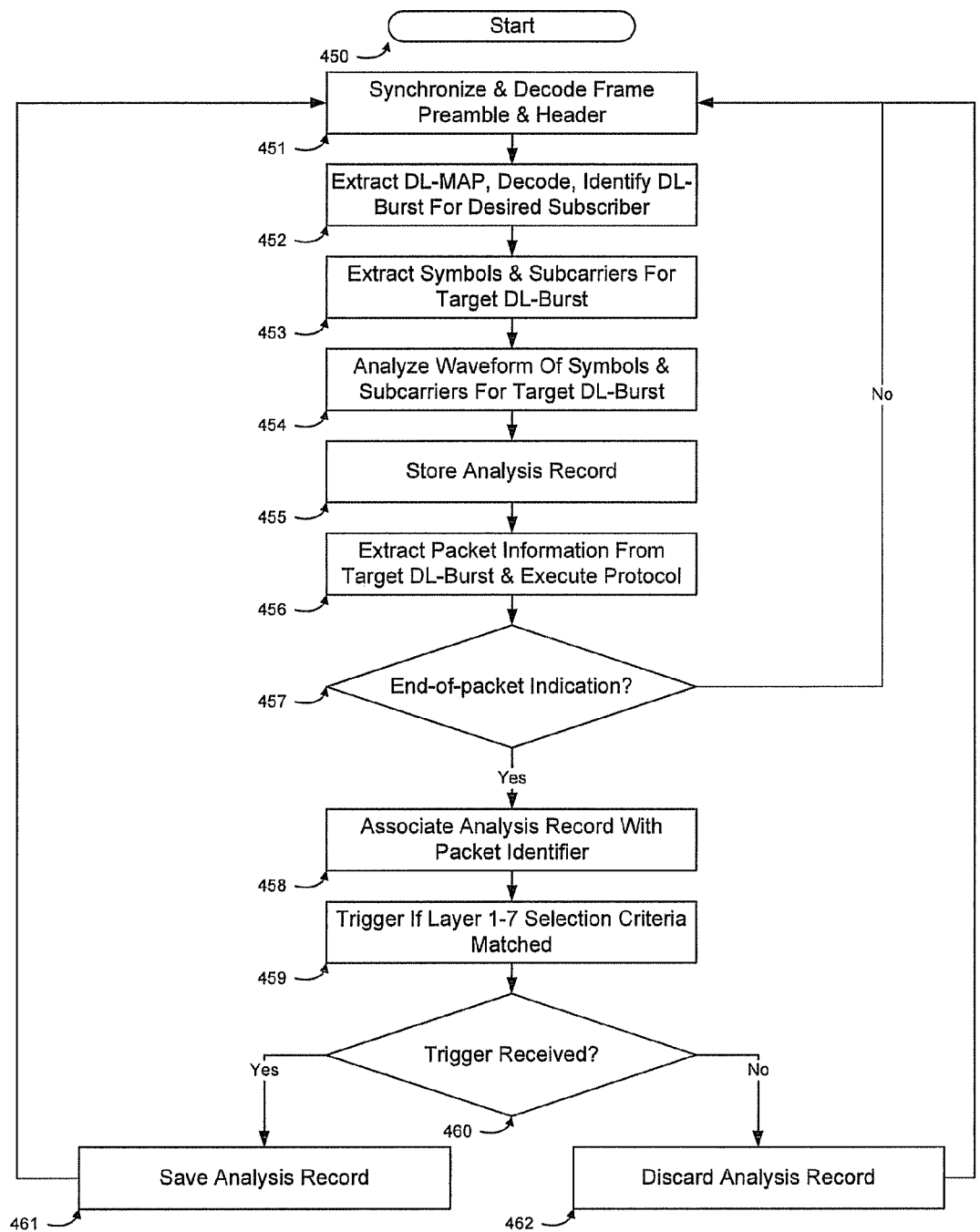
FIG. 17 represents an illustrative flow chart for a representative series of steps used for triggering LTE signal waveform analysis from decoded packet information, in accordance with an embodiment of the subject matter described herein.

Turning now to FIG. 17, an exemplary flowchart is shown for performing selective signal analysis on 4G LTE signals, preferably controlled by selection criteria derived from one or more of a plurality of protocol layers which may range from Layer 1 through 7 of the ISO/OSI protocol stack. The flowchart includes the steps of:

a) At step 450, starting the analysis process, for example with the necessary analysis parameters configured into analyzer 200 by test configuration and management system 105 responsive to traffic and signal test requirements 222;

b) At step 451, synchronizing to the DL frame preamble 401, determining the start of DL frame 400, and decoding the DL frame header symbols;

c) At step 452, extracting and decoding DL-MAP 402 within the DL frame header and using the information therein to identify DL bursts 403, 404, 405 and 406 representing various subscribers;

d) At step 453, identifying and extracting the symbols and subcarriers for the DL burst corresponding to one or more selected subscribers, which may further include the step of identifying the symbols and subcarriers corresponding to a particular packet within the target DL burst;

e) At step 454, performing waveform analysis on the extracted symbols and subcarriers for the DL burst, such waveform analysis preferably including signal quality checks such as EVM and PSD;

f) At step 455, storing the results of the analysis as an analysis record;

g) At step 456, extracting the packet data contained within the target DL burst and then performing the necessary higher layer protocol functions on it, such protocol functions including but not limited to MAC-layer processing, IP-layer processing, and TCP-layer processing;

h) At step 457, determining from the packet protocol processing as to whether an end-of-packet indication exists for the packet within the target DL burst, and repeating the frame synchronization and processing functions from step 451 if no end-of-packet indication is present;

i) At step 458, if an end-of-packet indication is present, associating the analysis record with the packet, preferably using a packet identifier that may be associated with the received packet by the protocol processing step;

j) At step 459, determining from the packet protocol processing as to whether the packet is of interest, preferably by using the selection criteria established for the waveforms of interest, and generating a trigger signal if so;

k) At step 460, determining whether a trigger signal has been received;

l) At step 461, saving the analysis record, preferably in conjunction with the packet identifier, if the trigger signal was received; and m) At step 462, discarding the analysis record if the trigger signal was not received.

Following the steps of FIG. 17, an embodiment of analyzer 200 may be configurable to detect a received packet having one or more of a plurality of particular characteristics and then trigger signal analysis of the DL burst containing the packet. The characteristics detected may preferably include FCS errors, packet address field values, packet sequence number field values, and traffic flow identifiers. This operation may utilize packet reception datapath 204 to signal to trigger signal generator 206 to indicate that the packet is present within the DL burst. Receive digital PHY logic 203 may further indicate the location of the DL burst in terms of symbols and subcarriers. Packet transmission datapath 201 may further be configured to provide a signal to trigger signal generator 206 to indicate when a particular packet is being transmitted. Finally, protocol engine 205 may be configured to provide a signal to trigger signal generator 206 to indicate when a predetermined step in the wireless communication protocol implemented between analyzer 200 and DUT 100 has been completed. These signals may be combined by trigger signal generator 206 to generate a trigger to receive waveform analyzer 207, which may perform waveform analysis on the indicated set of symbols and subcarriers and store the results into signal analysis memory 208. Saving or discarding the analysis record may be performed according to the steps shown in FIG. 17.

The procedure for mapping 4G LTE MAC layer packets to the combination of symbols and subcarriers containing these packets is well known in the art, and will not be repeated here. In accordance with an embodiment of analyzer 200, packet reception datapath 204 in conjunction with receive digital PHY logic 203 may therefore be configured to signal this information to trigger signal generator 206, which may then trigger receive waveform analyzer 207 so as to selectively perform analysis on the appropriate set of symbols and subcarriers within DL frame 400 corresponding to a specific packet or a set of packets.

The subject matter described herein may be applied to other test scenarios involving waveform analysis of digitally processed analog signals used for communication systems. In another embodiment, transmit D/A function 113 and receive A/D function 202 may be adapted to generate and accept high-speed optical signals, which may preferably be utilized for optical fiber communications. Such high-speed optical signals may employ high-order digital modulation techniques, preferably including Quadrature Amplitude Modulation (QAM), and high-order digital coding techniques, preferably including trellis coding. According to this embodiment, receive waveform analyzer 207 may be operative in conjunction with trigger signal generator 206 and signal analysis memory 208 to selectably analyze the waveform characteristics of received optical communication signals, and may further be operative in conjunction with receive digital PHY logic 203, packet reception datapath 204 and protocol engine 205 to perform such analysis responsive to a variety of conditions in the packets, traffic flows and protocols carried therein.

It is further apparent that the analysis functions performed upon digitized signal waveforms in the digital domain for wireless communication systems may share common functions. These functions may include filtering, windowing, Fast Fourier Transform, channel estimation, Automatic Gain Control (AGC), and clock phase recovery. In accordance with another embodiment, the functions of receive waveform analyzer 207 may be combined with the functions of receive digital PHY logic 203, and trigger signal generator 206 may be configured to trigger waveform analysis concurrently with demodulation and decoding. Advantageously, combining the protocol functions and signal analysis functions in this manner may reduce duplicated logic functions within analyzer 200.

It will be appreciated by those of ordinary skill in the art that wireless traffic, protocol and signal analyzer 200 in accordance with the embodiments described herein may be capable of performing waveform analysis on the basis of a variety of conditions responsive to a multiplicity of protocols that may be implemented by DUT 100, and may further coordinate the analysis of the signal waveform with the wireless communication protocol, traffic flows and data packets carried therein. It will further be apparent that an embodiment of analyzer 200 may be capable of performing automated waveform analysis responsive to a variety of test objectives. It will yet further be apparent that such an analyzer 200 may be able to reduce the amount of data captured and the processing required to handle the captured data. Advantageously, this may improve the efficiency of the test process and reduce the time required to conduct testing.

It will be further appreciated by those of ordinary skill in the art that, in accordance with the embodiments described herein, analyzer 200 may combine the protocol functions and signal analysis functions. Advantageously, this may simplify the task of causing a DUT 100 to generate signals desired for measurement.

It will also be further appreciated by those of ordinary skill in the art that, in accordance with the embodiments described herein, analyzer 200 may selectably analyze the signal properties of certain traffic flows with predetermined characteristics. Advantageously, these characteristics may include higher-layer properties such as QoS and TCP.

Accordingly, while the subject matter described herein has been described with reference to illustrative embodiments, this description is not intended to be construed in a limiting sense. Various modifications of the illustrative embodiments, as well as other embodiments of the subject matter described herein, will be apparent to persons of ordinary skill in the art, upon reference to this description. These modifications shall not be construed as departing from the scope of the subject matter described herein, which is defined solely by the claims appended hereto.

What is claimed is:

1. A system for testing a data communication device under test (DUT), comprising:
    a wireless traffic, protocol, and signal analyzer including:
        a packet transmission datapath for encoding and transmitting packetized data streams to said DUT;
        a packet reception datapath for receiving and decoding packetized data streams from said DUT;
        a protocol engine coupled to said packet transmission datapath and said packet reception datapath, and operative to implement a communication protocol;
        a trigger signal generator coupled to said protocol engine, said packet transmission datapath, and said packet reception datapath for receiving indications from said protocol engine, said packet transmission datapath, and said packet reception datapath, configured to generate a trigger signal based on one or more of said indications and operative to indicate a predetermined step within said communication protocol;
        a receive waveform analyzer coupled to said trigger signal generator, configured to couple to said DUT, and operative to perform a signal capture and a signal analysis function on said DUT, wherein a time and a duration of said signal capture are determined based on said trigger signal;
    wherein said trigger signal causes said receive waveform analyzer to perform said signal analysis function, and wherein said wireless traffic, protocol and receive waveform analyzer is configured to perform signal waveform analysis based on a variety of conditions associated with a plurality of wireless communication protocols implemented by said DUT and further to coordinate the signal waveform analysis with the wireless communication protocols, traffic flows, and data packets carried therein; and
    wherein said receive waveform analyzer checks to determine whether said trigger signal has been received from said trigger signal generator and if said trigger signal has not been received, refrains from performing said signal analysis function.

2. The system of claim 1, wherein said receive waveform analyzer is adapted to analyze communication signal waveforms.

3. The system of claim 2, wherein said signal analysis function is performed on said packetized data streams transmitted by said DUT.

4. The system of claim 2, wherein said receive waveform analyzer is further adapted to analyze the spectral characteristics of said communication signal waveforms.

5. The system of claim 2, wherein said receive waveform analyzer is further adapted to analyze the modulation accuracy of said communication signal waveforms.

6. The system of claim 1, wherein said receive waveform analyzer is integrated within said packet reception datapath.

7. The system of claim 6, wherein said packet reception datapath contains an analog to digital converter to digitize the signal received from said DUT, and said receive waveform analyzer is adapted to utilize said digitized signal.

8. The system of claim 1, wherein said trigger signal is generated at a time delay relative to said predetermined step within said communication protocol.

9. The system of claim 1, wherein said trigger signal is generated to indicate a predetermined packet relative to said predetermined step within said communication protocol.

10. The system of claim 9, wherein said predetermined step within said communication protocol corresponds to a first type of packet, and wherein said predetermined packet corresponds to a second type of packet.

11. The system of claim 10, wherein said first type of packet has a different modulation format from said second type of packet.

12. The system of claim 1, wherein said receive waveform analyzer is adapted to perform said signal analysis function a plurality of times, responsive to a plurality of occurrences of said trigger signal.

13. The system of claim 12, wherein the data from said plurality of signal analysis function results is combined.

14. The system of claim 1, wherein said protocol engine and said packet transmission datapath are further adapted to cause said DUT, responsive to said communication protocol, to transmit a plurality of packet types.

15. The system of claim 14, wherein said trigger signal is operative to indicate the occurrence of a first packet type of said plurality of packet types.

16. The system of claim 14, wherein said first packet type is selected in accordance with a specific test requirement.

17. A system for testing a wireless data communication device under test (DUT), comprising:
    a wireless traffic, protocol, and signal analyzer including:
        a packet transmission datapath for encoding and transmitting wireless data packets to said DUT, said transmitted data packets being associated with a plurality of identifiable traffic flows;
a packet reception datapath for receiving and decoding wireless data packets from said DUT, said received data packets being associated with said plurality of identifiable traffic flows;
a protocol engine coupled to said packet transmission datapath and said packet reception datapath, and operative to implement a wireless communication protocol;
a trigger signal generator coupled to said protocol engine, said packet transmission datapath, and said packet reception datapath for receiving indications from said protocol engine, said packet transmission datapath, and said packet reception datapath, configured to generate a trigger signal based on one or more of said indications and operative to indicate a first traffic flow selected from said plurality of identifiable traffic flows;
a radio frequency analyzer configured to couple to said DUT, and operative to perform a signal capture and a signal analysis function on said wireless data packets received from said DUT, wherein a time and a duration of said signal capture are determined based on said trigger signal;
wherein said trigger signal causes said radio frequency analyzer to perform said signal analysis function, and wherein said wireless traffic, protocol and signal analyzer is configured to perform signal waveform analysis based on a variety of conditions associated with a plurality of wireless communication protocols implemented by said DUT and further to coordinate the signal waveform analysis with the wireless communication protocols, traffic flows, and data packets carried therein; and
wherein said radio frequency analyzer checks to determine whether said trigger signal has been received from said trigger signal generator and if said trigger signal has not been received, refrains from performing said signal analysis function.

18. The system of claim 17, wherein said radio frequency analyzer is adapted to analyze the modulation accuracy of the wireless data packets transmitted by said DUT.

19. The system of claim 17, wherein said trigger signal is further operative to indicate a first data packet within a plurality of wireless data packets comprising said predetermined traffic flow.

20. The system of claim 17, wherein said radio frequency analyzer performs said signal analysis function on said first data packet.

21. The system of claim 17, wherein said trigger signal is further conditioned according to a data value present within said first data packet.

22. The system of claim 21, wherein said first data packet selectably indicates the presence of a second data packet within said plurality of wireless data packets, and further wherein said radio frequency analyzer performs said signal analysis function on said second data packet.

23. The system of claim 21, wherein said data value is a Frame Check Sequence (FCS) value, and further wherein said FCS value selectably indicates the error status of said first data packet.

24. The system of claim 17, wherein said trigger signal is further operative to indicate a predetermined packet exchange within said wireless communication protocol for said first traffic flow.

25. The system of claim 24, wherein said predetermined packet exchange is a ready to send/clear to send (RTS/CTS) exchange.

26. The system of claim 24, wherein said predetermined packet exchange is a clear to send (CTS)-to-self exchange.

27. The system of claim 17, wherein said protocol engine is further operative to cause said DUT to transmit data packets of a predetermined type in accordance with a specific test requirement.

28. A system for testing a wireless data communication device under test (DUT), comprising:
a wireless traffic, protocol, and signal analyzer including:
a reception datapath for receiving and decoding wireless data from said DUT, the wireless data being formatted according to a format for communicating wireless data, said format including a framing structure, said framing structure further including a plurality of symbols, said symbols containing information corresponding to a plurality of data packet streams, and extracting packet data from said wireless data;
a trigger signal generator coupled to said reception datapath, and operative to receive a plurality of receive data packet streams and to generate a first trigger signal generated for indicating a first region within said framing structure;
a radio frequency analyzer configured to couple to said DUT, and operative to perform a signal analysis function on said symbols within said wireless data formatted according to said format;
wherein said first trigger signal causes said radio frequency analyzer to perform said signal analysis function;
test traffic generation logic operative to generate a plurality of transmit data packet streams;
a transmission datapath coupled to said test traffic generation logic and operative to accept said transmit data packet streams and encode and transmit them as wireless data, formatted according to said format, to said DUT;
wherein said test traffic generation logic generates a second trigger signal operative to indicate a second region within said framing structure; and
wherein said second trigger signal causes said radio frequency analyzer to perform said signal analysis function.

29. The system of claim 28, wherein said first region indicates a first stream of said plurality of receive data packet streams.

30. The system of claim 29, wherein said first region further indicates a first one of a plurality of packets comprising said first stream.

31. The system of claim 28, further comprising:
a protocol engine coupled to said test traffic generation logic and test traffic analysis logic, operative to implement a communications protocol; and
a third trigger signal generated by said protocol engine, and operative to indicate a predetermined step within said communications protocol;
wherein said third trigger signal causes said radio frequency analyzer to perform said signal analysis function.

32. The system of claim 31, further comprising trigger combination logic that selectably combines said first trigger signal, said second trigger signal, and said third trigger signal, wherein said signal analysis function is performed according to the results of said trigger combination logic.

33. The system of claim 28, further comprising header decoding logic for decoding a plurality of header symbols within said framing structure.

34. The system of claim 33, wherein said first trigger signal is further conditioned by said header decoding logic.

35. The system of claim 34, wherein said first trigger signal is further conditioned by an indication of a receive error.

36. A method of analyzing a waveform generated by a data communication device under test (DUT), comprising the steps of:
in a wireless traffic, protocol, and signal analyzer:
providing a trigger signal generator coupled to a protocol engine, packet transmission datapath, and a packet reception datapath within said wireless traffic, protocol, and signal analyzer;
receiving, by said trigger signal generator, indications from said protocol engine, said packet transmission datapath, and said packet reception datapath;
generating, by said trigger signal generator, a trigger signal based on one or more of said indications;
communicating with said DUT, in accordance with a communication protocol;
performing a signal capture and a signal analysis function on the waveform of signals received from said DUT, wherein a time and a duration of said signal capture are determined based on said trigger signal;
wherein said signal analysis function is triggered at a predetermined point within said communication protocol, and wherein said wireless traffic, protocol and signal analyzer is configured to perform signal waveform analysis based on a variety of conditions associated with a plurality of wireless communication protocols implemented by said DUT and further to coordinate the signal waveform analysis with the wireless communication protocols, traffic flows, and data packets carried therein; and
checking to determine whether said trigger signal has been received from said trigger signal generator and if said trigger signal has not been received, refraining from performing said signal analysis function.

37. The method of claim 36, wherein said signal analysis function is a spectral analysis function.

38. The method of claim 36, wherein said signal analysis function is a modulation accuracy analysis function.

39. The method of claim 38, wherein said modulation accuracy analysis function is an error vector magnitude analysis function.

40. The method of claim 36, wherein said predetermined point within said communication protocol is indicated by decoding at least a first packet of a predetermined type.

41. The method of claim 36, wherein said signal analysis function is performed a plurality of times, responsive to said communications protocol, to yield a plurality of analysis function results.

42. The method of claim 41, wherein the data from said plurality of signal analysis function results is combined.

43. The method of claim 36, further including the steps of:
transmitting at least a first packet to said DUT, in accordance with said communication protocol;
delaying by a predetermined interval; and
performing said signal analysis function on at least a second packet received from said DUT.

44. The method of claim 36, further including the steps of:
transmitting at least a first packet to said DUT, in accordance with said communication protocol;
receiving and decoding a plurality of packets transmitted by said DUT;
waiting until at least a second packet of a predetermined type has been received from said DUT; and
performing said signal analysis function on said at least second packet.

45. The method of claim 44, wherein said second packet is identified by at least a sequence number field present within said second packet.

46. The method of claim 44, wherein said second packet is identified by at least one address field present within said second packet.

47. A non-transitory computer readable medium having stored thereon executable instructions that when executed by the processor of a computer control the computer to perform steps comprising:
in a wireless traffic, protocol, and signal analyzer:
providing a trigger signal generator to a packet transmission datapath, a packet reception datapath and a protocol engine within said wireless traffic, protocol, and signal analyzer;
receiving, by said trigger signal generator, indications from said protocol engine, said packet transmission datapath, and said packet reception datapath;
generating, by said trigger signal generator, a trigger signal based on one or more of said indications;
communicating with said DUT, in accordance with a communication protocol;
performing a signal capture and a signal analysis function on the waveform of signals received from said DUT, wherein a time and a duration of said signal capture are determined based on said trigger signal;
wherein said signal analysis function is triggered at a predetermined point within said communication protocol, and wherein said wireless traffic, protocol and signal analyzer is configured to perform signal waveform analysis based on a variety of conditions associated with a plurality of wireless communication protocols implemented by said DUT and further to coordinate the signal waveform analysis with the wireless communication protocols, traffic flows, and data packets carried therein; and
checking to determine whether said trigger signal has been received from said trigger signal generator and if said trigger signal has not been received, refrains from performing said signal analysis function.

* * * * *